(12) United States Patent
Li et al.

(10) Patent No.: US 12,035,314 B2
(45) Date of Patent: Jul. 9, 2024

(54) METHOD FOR MULTIPLEXING UPLINK CONTROL INFORMATION AND APPARATUS

(71) Applicant: Huawei Technologies Co., Ltd., Shenzhen (CN)

(72) Inventors: Shengyu Li, Beijing (CN); Lei Guan, Beijing (CN); Ruixiang Ma, Beijing (CN); Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 17/371,995

(22) Filed: Jul. 9, 2021

(65) Prior Publication Data

US 2021/0337538 A1 Oct. 28, 2021

Related U.S. Application Data

(63) Continuation of application No. PCT/CN2020/071853, filed on Jan. 13, 2020.

(30) Foreign Application Priority Data

Jan. 11, 2019 (CN) .......................... 201910028316.4

(51) Int. Cl.
*H04W 72/21* (2023.01)
*H04L 1/1812* (2023.01)
*H04L 5/00* (2006.01)

(52) U.S. Cl.
CPC ........... *H04W 72/21* (2023.01); *H04L 1/1812* (2013.01); *H04L 5/0055* (2013.01)

(58) Field of Classification Search
CPC ............................... H04W 72/21; H04L 5/001

(Continued)

(56) References Cited

U.S. PATENT DOCUMENTS

| 8,520,757 B2 | 8/2013 | Kishiyama et al. |
| 9,320,010 B2 | 4/2016 | Segev |

(Continued)

FOREIGN PATENT DOCUMENTS

| CN | 102106170 A | 6/2011 |
| CN | 102378385 A | 3/2012 |

(Continued)

OTHER PUBLICATIONS

CATT, "On UCI multiplexing on PUCCH", 3GPP TSG RAN WG1 Meeting #93, R1-1806293, May 21-25, 2018, 7 pages, Busan, Korea.

(Continued)

*Primary Examiner* — Kiet M Doan
(74) *Attorney, Agent, or Firm* — Slater Matsil, LLP

(57) ABSTRACT

This application provides a method for multiplexing uplink control information, and relates to the wireless communications field. When a resource of a first uplink control channel that carries first HARQ-ACK information does not overlap a resource of a second uplink control channel that carries second HARQ-ACK information in time domain, but a resource of a third uplink control channel that carries an SR/CSI overlaps both the resource of the first uplink control channel and the resource of the second uplink control channel in time domain, a base station and UE determine, based on a format of the first uplink control channel, a format of the second uplink control channel, and a format of the third uplink control channel, that third HARQ-ACK information and first UCI are multiplexed for transmission, where the third HARQ-ACK information is the first HARQ-ACK information or the second HARQ-ACK information.

15 Claims, 9 Drawing Sheets

(58) Field of Classification Search
USPC .................................. 370/330, 329; 455/522
See application file for complete search history.

(56) References Cited

U.S. PATENT DOCUMENTS

| | | | |
|---|---|---|---|
| 9,674,822 B2 | 6/2017 | Hwang et al. | |
| 10,616,916 B2 | 4/2020 | Kim et al. | |
| 10,813,113 B2 | 10/2020 | Shimezawa | |
| 2017/0215179 A1 | 7/2017 | Choi et al. | |
| 2018/0376496 A1 | 12/2018 | Wang et al. | |
| 2020/0204308 A1* | 6/2020 | Chen | H04L 5/0035 |
| 2020/0389914 A1 | 12/2020 | Zhao | |
| 2021/0204311 A1* | 7/2021 | Takeda | H04L 1/1861 |

FOREIGN PATENT DOCUMENTS

| | | |
|---|---|---|
| CN | 105765403 A | 7/2016 |
| CN | 106067845 A | 11/2016 |
| CN | 107027184 A | 8/2017 |
| CN | 108023687 A | 5/2018 |
| CN | 108155977 A | 6/2018 |
| CN | 108183775 A | 6/2018 |
| CN | 108401488 A | 8/2018 |
| CN | 108781444 A | 11/2018 |
| CN | 108988997 A | 12/2018 |
| EP | 2645604 A1 | 10/2013 |
| WO | 2013125908 A1 | 8/2013 |
| WO | 2017023146 A1 | 2/2017 |

OTHER PUBLICATIONS

3GPP TS 38.212 V15.3.0, "3rd Generation Partnership Project, Technical Specification Group Radio Access Network, NR, Multiplexing and channel coding (Release 15)", (Sep. 2018), 99 pages.
3GPP TS 38.213 V15.3.0, "3rd Generation Partnership Project; Technical Specification Group Radio Access Network; NR; Physical layer procedures for control(Release 15)", (Sep. 2018), 101 pages.
Xiaomi Communications, "On Remaining issues of UCI multiplexing", 3GPP TSG RAN WG1 Meeting #93, R1-1807168, May 21-25, 2018, 3 pages, Busan, Korea.
Qualcomm Incorporated, "Remaining issues for overlapping UL transmissions", 3GPP TSG RAN WG1 Meeting #93, R1-1807359, May 21-25, 2018, 12 pages, Busan, Korea.

* cited by examiner

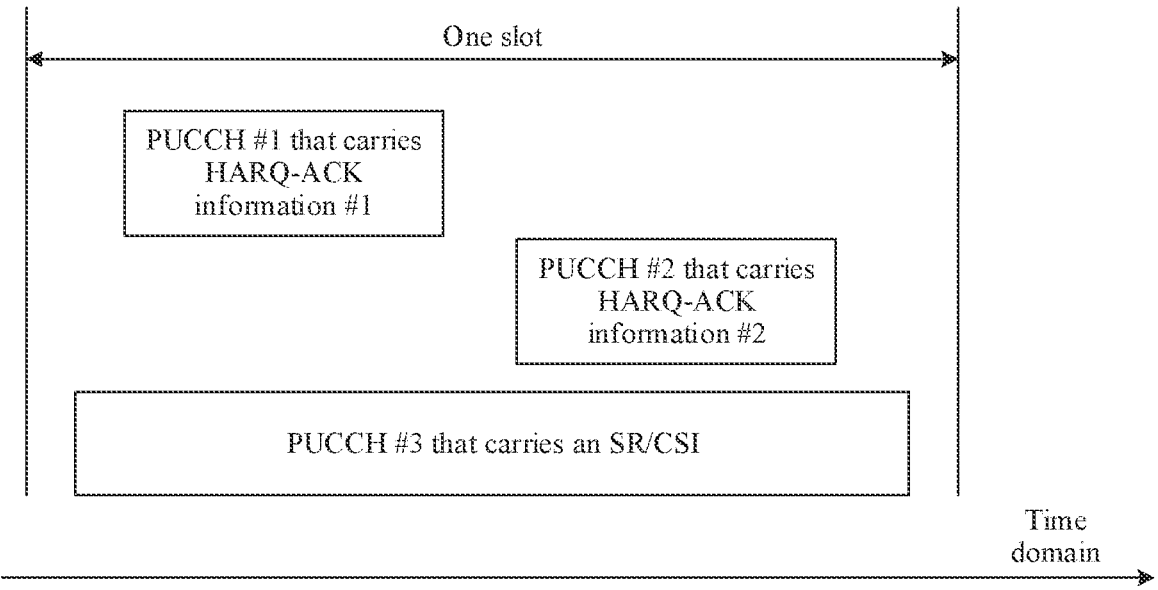

FIG. 3

S410: Determine a resource of a first uplink control channel, where the first uplink control channel is used to carry first HARQ-ACK information S420: Determine a resource of a second uplink control channel, where the second uplink control channel is used to carry second HARQ-ACK information, and the resource of the second uplink control channel does not overlap the resource of the first uplink control channel in time domain S430: Determine a resource of a third uplink control channel, where the third uplink control channel is used to carry CSI or an SR, and the resource of the third uplink control channel overlaps the resource of the first uplink control channel and the resource of the second uplink control channel in time domain S440: Determine a resource of a fourth uplink control channel, where the fourth uplink control channel is used to carry third HARQ-ACK information and first UCI, and the third HARQ-ACK information is either the first HARQ-ACK information or the second HARQ-ACK information

FIG. 4

METHOD FOR MULTIPLEXING UPLINK CONTROL INFORMATION AND APPARATUS

CROSS-REFERENCE TO RELATED APPLICATIONS

This application is a continuation of International Application No. PCT/CN2020/071853, filed on Jan. 13, 2020, which claims priority to Chinese Patent Application No. 201910028316.4, filed on Jan. 11, 2019. The disclosures of the aforementioned applications are hereby incorporated by reference in their entireties.

TECHNICAL FIELD

Embodiments of this application relate to the wireless communications field, and in particular, to a method for multiplexing uplink control information and an apparatus.

BACKGROUND

A hybrid automatic repeat request (HARQ) technology is supported in new radio (NR) in a 5th generation (5G) mobile communications system defined in the 3rd generation partnership project (3GPP). For downlink data transmission, after receiving data sent by a network device, if a terminal device successfully decodes the data, the terminal device feeds back an acknowledgement (ACK) to the network device; or if a terminal device fails to decode the data, the terminal device feeds back a negative acknowledgement (NACK) to the network device. Herein, the ACK and the NACK may be collectively referred to as hybrid automatic repeat request-acknowledgement (HARQ-ACK) information. Combined decoding may be performed on retransmitted data and initially transmitted data by using the HARQ technology, thereby effectively improving data transmission efficiency.

In a protocol defined in the 3GPP Release 15 (R15), a plurality of ACKs or NACKs fed back in one slot need to be jointly coded for transmission. Consequently, a feedback latency of the ACK/NACK is increased. Therefore, in a standard discussion of the 3GPP Release 16, most companies agree to support feedback of a plurality of HARQ-ACK codebooks in one slot, that is, support time division multiplexing of a plurality of physical uplink control channel (PUCCH) resources in one slot, and different PUCCH resources carry different HARQ-ACK codebooks. In this way, the feedback latency of the ACK/NACK is reduced.

SUMMARY

This application provides a method for multiplexing uplink control information and an apparatus, to effectively reduce a feedback latency of an ACK/NACK, improve data transmission efficiency, and reduce a data transmission latency.

According to a first aspect, this application provides a method for multiplexing uplink control information. The method may be performed by a network device, a component used in a network device, a terminal device, or a component used in a terminal device. The method includes: determining a resource of a first uplink control channel, where the first uplink control channel is used to carry first HARQ-ACK information, the first HARQ-ACK information is used to indicate whether a first downlink data channel set is correctly decoded, and the first downlink data channel set includes at least one downlink data channel; determining a resource of a second uplink control channel, where the second uplink control channel is used to carry second HARQ-ACK information, the second HARQ-ACK information is used to indicate whether a second downlink data channel set is correctly decoded, the second downlink data channel set includes at least one downlink data channel, the second downlink data channel set is different from the first downlink data channel set, and the resource of the second uplink control channel does not overlap the resource of the first uplink control channel in time domain; determining a resource of a third uplink control channel, where the third uplink control channel is used to carry first UCI, the first UCI includes CSI or an SR, and the resource of the third uplink control channel overlaps both the resource of the first uplink control channel and the resource of the second uplink control channel in time domain; and determining a resource of a fourth uplink control channel, where the fourth uplink control channel is used to carry third HARQ-ACK information and the first UCI, the third HARQ-ACK information is the first HARQ-ACK information or the second HARQ-ACK information, and the third HARQ-ACK information is determined based on a format of the first uplink control channel, a format of the second uplink control channel, and a format of the third uplink control channel, or the third HARQ-ACK information is HARQ-ACK information that meets a first condition and that is either the first HARQ-ACK information or the second HARQ-ACK information.

According to the foregoing method for multiplexing uplink control information, when transmission resources of a plurality of pieces of uplink control information overlap in time domain, two pieces of appropriate uplink control information may be selected for multiplex transmission, so that transmission reliability of the uplink control information can be improved, a transmission latency of the uplink control information can be reduced, and data transmission efficiency can be further improved.

When the method is performed by the terminal device or the component used in the terminal device:

In a possible implementation of the first aspect, when the third HARQ-ACK information is the first HARQ-ACK information, the resource of the fourth uplink control channel does not overlap the resource of the second uplink control channel, and the method further includes: sending the first HARQ-ACK information and the first UCI on the resource of the fourth uplink control channel, and sending the second HARQ-ACK information on the resource of the second uplink control channel.

In a possible implementation of the first aspect, when the third HARQ-ACK information is the first HARQ-ACK information, the method further includes: when the resource of the fourth uplink control channel does not overlap the resource of the second uplink control channel, sending the first HARQ-ACK information and the first UCI on the resource of the fourth uplink control channel, and sending the second HARQ-ACK information on the resource of the second uplink control channel; and/or when the resource of the fourth uplink control channel overlaps the resource of the second uplink control channel, sending the first HARQ-ACK information, the second HARQ-ACK information, and the first UCI on a resource of a fifth uplink control channel, where the resource of the fifth uplink control channel is determined based on a total quantity of bits of the first HARQ-ACK information, the second HARQ-ACK information, and the first UCI.

When the method is performed by the network device or the component used in the network device:

In a possible implementation of the first aspect, when the third HARQ-ACK information is the first HARQ-ACK information, the resource of the fourth uplink control channel does not overlap the resource of the second uplink control channel, and the method further includes: receiving the first HARQ-ACK information and the first UCI on the resource of the fourth uplink control channel, and receiving the second HARQ-ACK information on the resource of the second uplink control channel.

In a possible implementation of the first aspect, when the third HARQ-ACK information is the first HARQ-ACK information, the method further includes: when the resource of the fourth uplink control channel does not overlap the resource of the second uplink control channel, receiving the first HARQ-ACK information and the first UCI on the resource of the fourth uplink control channel, and sending the second HARQ-ACK information on the resource of the second uplink control channel; and/or when the resource of the fourth uplink control channel overlaps the resource of the second uplink control channel, receiving the first HARQ-ACK information, the second HARQ-ACK information, and the first UCI on a resource of a fifth uplink control channel, where the resource of the fifth uplink control channel is determined based on a total quantity of bits of the first HARQ-ACK information, the second HARQ-ACK information, and the first UCI.

According to a second aspect, this application provides a method for multiplexing uplink control information. The method may be performed by a network device and a terminal device, or may be performed by a component of a network device and a component of a terminal device. The following uses an example in which the method is performed by the network device and the terminal device for description. The method includes: A network device sends first information to a terminal device. The first information indicates that a hybrid automatic repeat request-acknowledgement HARQ-ACK codebook is a dynamic codebook. The network device and the terminal device determine a resource of a first uplink control channel. The first uplink control channel is used to carry first HARQ-ACK information, the first HARQ-ACK information is used to indicate whether a first downlink data channel set is correctly decoded, and the first downlink data channel set includes at least one downlink data channel. The network device and the terminal device determine a resource of a second uplink control channel. The second uplink control channel is used to carry second HARQ-ACK information. The second HARQ-ACK information is used to indicate whether a second downlink data channel set is correctly decoded, the second downlink data channel set includes at least one downlink data channel, the second downlink data channel set is different from the first downlink data channel set, and the resource of the second uplink control channel does not overlap the resource of the first uplink control channel in time domain. The network device sends second information to the terminal device. The second information includes third information, the third information is used to indicate a resource of a first uplink data channel, and the resource of the first uplink data channel overlaps the resource of the first uplink control channel and the resource of the second uplink control channel in time domain. The terminal device sends the first HARQ-ACK information and the second HARQ-ACK information to the network device on the resource of the first uplink data channel.

In a possible implementation of the second aspect, the second information is DCI, and the second information further includes a first DAI. The first DAI is used in determining codebooks of the first HARQ-ACK information and the second HARQ-ACK information.

In a possible implementation of the second aspect, the second information is DCI, and the second information further includes a first DAI. The first DAI is used in determining a codebook of third HARQ-ACK information, and the third HARQ-ACK information is the first HARQ-ACK information or the second HARQ-ACK information.

In a possible implementation of the second aspect, a method for determining the third HARQ-ACK information includes: The network device sends sixth information to the terminal device. The sixth information indicates the third HARQ-ACK information; or the third HARQ-ACK information is predefined; or the third HARQ-ACK information is HARQ-ACK information that meets a fifth condition and that is either the first HARQ-ACK information or the second HARQ-ACK information.

In a possible implementation of the second aspect, the second information is DCI, and the second information further includes a second DAI and a third DAI. The second DAI is used in determining a codebook of the first HARQ-ACK information, and the third DAI is used in determining a codebook of the second HARQ-ACK information.

In a possible implementation of the second aspect, the second information is DCI, and the second information further includes fourth information. The fourth information is used to indicate a first offset value and a second offset value. The first offset value is used to determine a resource for transmitting the first HARQ-ACK information, and the second offset value is used to determine a resource for transmitting the second HARQ-ACK information.

In a possible implementation of the second aspect, the method further includes: The network device sends fifth information to the terminal device. The fifth information includes P groups of offset values, each group of offset values includes two offset values, and P is a positive integer. The fourth information indicates an index of a group of offset values in the P groups of offset values.

In a possible implementation of the second aspect, the second information further includes a third offset value, the third offset value is used to determine a resource for transmitting the third HARQ-ACK information, and the third HARQ-ACK information is the first HARQ-ACK information or the second HARQ-ACK information.

In a possible implementation of the second aspect, the second information further includes a first offset value and a second offset value. The first offset value is used to determine a resource for transmitting the first HARQ-ACK information, and the second offset value is used to determine a resource for transmitting the second HARQ-ACK information. Optionally, the second information herein may be DCI, or may be a parameter in higher layer signaling.

According to the foregoing method for multiplexing uplink control information, when two uplink control information resources that do not overlap each other both overlap an uplink data channel resource, an appropriate resource parameter may be selected to determine a resource occupied when corresponding uplink control information is multiplexed on the uplink data channel resource for transmission, so that a transmission latency and transmission reliability of the corresponding uplink control information are ensured.

According to a third aspect, a communications apparatus is provided, including modules configured to implement the functions of the terminal device or the network device according to the first aspect or the second aspect.

According to a fourth aspect, a communications apparatus is provided, including a processor and an interface circuit.

The communications apparatus is configured to implement the functions of the terminal device or the network device according to the first aspect or the second aspect.

According to a fifth aspect, a computer-readable storage medium is provided. The computer-readable storage medium stores a computer program or an instruction. When the computer program or the instruction is executed, the method according to any one of the first aspect or the possible implementations of the first aspect is implemented, or the method according to any one of the second aspect or the possible implementations of the second aspect is implemented.

According to a sixth aspect, a computer program product including an instruction is provided. When the instruction is run, the method according to any one of the first aspect or the possible implementations of the first aspect is implemented, or the method according to any one of the second aspect or the possible implementations of the second aspect is implemented.

BRIEF DESCRIPTION OF THE DRAWINGS

FIG. 3 shows another control information multiplex transmission scenario to which an embodiment of this application is applied;

FIG. 4 is a schematic diagram of a processing process of uplink control information multiplex transmission according to an embodiment of this application;

DETAILED DESCRIPTION OF ILLUSTRATIVE EMBODIMENTS

Figure 1:
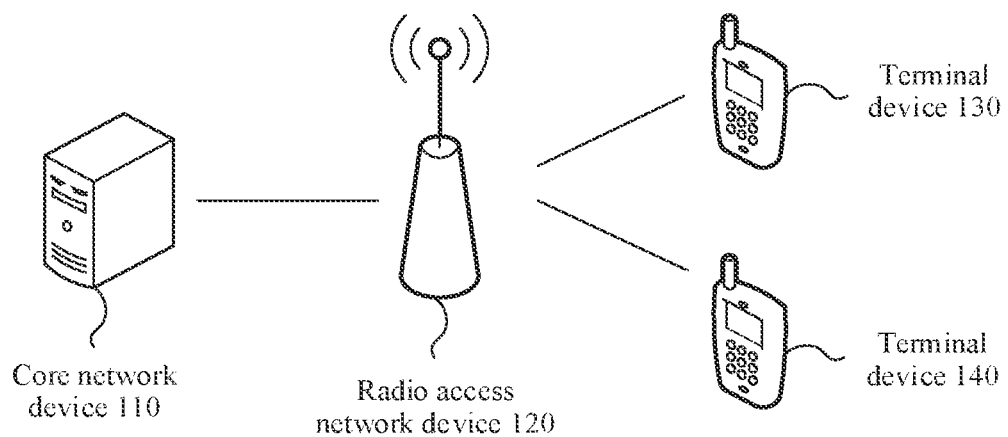
FIG. 1 is a schematic diagram of an architecture of a mobile communications system to which an embodiment of this application is applied.

FIG. 1 is a schematic diagram of an architecture of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different independent physical devices, or a function of the core network device and a logical function of the radio access network device may be integrated into a same physical device, or a part of a function of the core network device and a part of a function of the radio access network device may be integrated into one physical device. The terminal device may be located at a fixed location, or may be mobile. FIG. 1 is only a schematic diagram. The mobile communications system may further include another network device, for example, may further include a wireless relay device and a wireless backhaul device, which are not shown in FIG. 1. Quantities of core network devices, radio access network devices, and terminal devices included in the mobile communications system are not limited in the embodiments of this application.

The radio access network device is an access device used by the terminal device to access the mobile communications system in the wireless manner, and may be a NodeB (NodeB), an evolved NodeB (eNodeB), a transmission reception point (TRP), a next generation NodeB (gNB) in a 5G mobile communications system, a base station in a future mobile communications system, or an access node in a Wi-Fi system; or may be a module or a unit that completes a part of a function of a base station, for example, may be a central unit (CU), or may be a distributed unit (DU). A specific technology and a specific device form used by the radio access network device are not limited in the embodiments of this application. In this application, the radio access network device is referred to as a network device for short. Unless otherwise specified, the network device is the radio access network device.

The terminal device may also be referred to as a terminal, user equipment (UE), a mobile station (MS), a mobile terminal (MT), or the like. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. A specific technology and a specific device form used by the terminal device are not limited in the embodiments of this application.

The network device and the terminal device may be deployed on the land, including an indoor device, an outdoor device, a handheld device, or a vehicle-mounted device; may be deployed on the water; or may be deployed on an airplane, a balloon, and a satellite in the air. Application scenarios of the network device and the terminal device are not limited in the embodiments of this application.

Communication between the network device and the terminal device may be performed by using a licensed spectrum, or may be performed by using an unlicensed spectrum, or may be performed by using both a licensed spectrum and an unlicensed spectrum. Communication between the network device and the terminal device may be performed by using a spectrum below 6 gigahertz (GHz), or may be performed by using a spectrum above 6 GHz, or may be performed by using both a spectrum below 6 GHz and a spectrum above 6 GHz. A spectrum resource used between the network device and the terminal device is not limited in the embodiments of this application.

In this application, two terms of UE and the terminal device may be interchanged, and two terms of the base station and the network device may also be interchanged.

To facilitate understanding of the embodiments of this application, the following first briefly describes HARQ-ACK timing, determining of a HARQ-ACK codebook, and determining of a PUCCH resource that are defined in 3GPP Release 15.

HARQ-ACK Timing

A physical downlink shared channel (PDSCH) may be dynamically scheduled by downlink control information (DCI), or resource configuration may be performed by using radio resource control (RRC) signaling, and data transmission is performed after the PDSCH is activated by using the DCI. The DCI includes information about a slot off-set value $K_1$, and the information is used to indicate an off-set value between a slot in which PDSCH transmission is located and a slot in which ACK/NACK transmission is located.

Determining of a HARQ-ACK Codebook

The HARQ-ACK codebook is an arrangement of bits of one or more pieces of ACK/NACK information that need to be fed back on a same uplink channel (for example, a PUCCH). The HARQ-ACK codebook includes two types: a dynamic codebook and a semi-static codebook. The semi-static codebook is also referred to as a type-1 (Type-1) HARQ-ACK codebook. UE feeds back, on a corresponding PUCCH resource, HARQ-ACK information corresponding to all possible PDSCHs, regardless of whether a corresponding PDSCH is received by the UE. To reduce feedback overheads of the HARQ-ACK information, the 3GPP supports the dynamic codebook. The dynamic codebook is also referred to as a type-2 (Type-2) HARQ-ACK codebook. For the dynamic codebook, the UE provides ACK/NACK feedback only for the received PDSCH and a PDSCH whose detection is missed before.

If a plurality of pieces of ACK/NACK information corresponding to a plurality of PDSCHs point to a same HARQ-ACK codebook, to assist the UE in finding whether detection of a PDSCH is missed before, the base station adds one piece of downlink assignment index (DAI) information to DCI for scheduling the PDSCHs, to indicate a specific PDSCH that is in the HARQ-ACK codebook and that is scheduled this time. After receiving the DCI, the UE may determine, based on whether values of DAIs are continuous, whether the detection of the PDSCH on which the ACK/NACK information is fed back and that is in the HARQ-ACK codebook is missed before. In R15, ACK/NACK information that needs to be fed back in a same uplink slot forms one HARQ-ACK codebook.

Determining of a PUCCH Resource

After a HARQ-ACK codebook in one slot is determined, the UE may select one PUCCH resource set based on a payload size of the HARQ-ACK codebook. The payload size of the HARQ-ACK codebook herein refers to a quantity of bits of ACK/NACK information included in the HARQ-ACK codebook. Each PUCCH resource set includes a minimum of eight PUCCH resources and a maximum of 32 PUCCH resources. The UE further determines, based on a received PUCCH resource indicator (PRI) field in the DCI, which PUCCH resource in the selected PUCCH resource set is a PUCCH resource that carries the HARQ-ACK codebook, where the DCI is the latest DCI of a group of pieces of DCI, and each piece of DCI meets a condition: HARQ-ACK information of a PDSCH scheduled by the DCI belongs to the HARQ-ACK codebook. The PRI field usually has three bits. When a quantity of PUCCH resources in the PUCCH resource set is greater than 8, the PUCCH resource set is divided into eight PUCCH resource subsets, and the PRI field is used to indicate a specific PUCCH resource subset to be selected. The UE may implicitly determine a specific PUCCH resource in the PUCCH resource subset based on an index of a start control channel element (CCE) that carries the PDCCH.

As defined in an NR protocol of the current 3GPP Release 15, the UE does not support simultaneous transmission of two overlapping PUCCHs in time domain, and does not support simultaneous transmission of a PUCCH and a physical uplink shared channel (PUSCH) that overlap in time domain. In the embodiments of this application, unless otherwise specified, that two channels overlap means that time-frequency resources for transmitting the two channels overlap in time domain. Overlapping in time domain includes two scenarios: partially overlapping in time domain and completely overlapping in time domain. When time domain symbols corresponding to two time-frequency resources are partially the same, it is considered that the two time-frequency resources partially overlap in time domain. When time domain symbols corresponding to two time-frequency resources are completely the same, it is considered that the two time-frequency resources completely overlap in time domain. When time domain symbols corresponding to two time-frequency resources are completely different, it is considered that the two time-frequency resources do not overlap in time domain.

Uplink control information (UCI) carried on a PUCCH includes HARQ-ACK information, channel state information (CSI), and a scheduling request (SR). After a PUCCH #1 and a PUCCH #2 overlap in time domain, UCI 1 carried on the PUCCH #1 and UCI 2 carried on the PUCCH #2 need to be multiplexed, and are sent on a resource corresponding to the PUCCH #1 or the PUCCH #2, or are sent on a new PUCCH resource. When the PUCCH #1 and a PUSCH overlap in time domain, the UCI 1 needs to be multiplexed with data carried on the PUSCH, and then the multiplexed UCI 1 and data are sent by using a PUSCH resource.

The PUCCH defined in the NR protocol includes five formats: PUCCH format 0, PUCCH format 1, PUCCH format 2, PUCCH format 3, and PUCCH format 4. PUCCH format 0 and PUCCH format 1 are used to carry 1-bit UCI and 2-bit UCI. The UCI includes an SR and HARQ-ACK information, and frequency domain resource widths corresponding to PUCCH format 0 and PUCCH format 1 each are one resource block (RB). PUCCH format 2, PUCCH format 3, and PUCCH format 4 are used to carry UCI of more than 2 bits. The UCI includes HARQ-ACK information and CSI. Frequency domain resource widths corresponding to PUCCH format 2 and PUCCH format 3 each are variable, and a frequency domain resource width corresponding to PUCCH format 4 is one RB. Time domain lengths corresponding to PUCCH format 0 and PUCCH format 2 each are one or two time domain symbols. Therefore, PUCCHs of PUCCH format 0 and PUCCH format 2 each are also referred to as a short PUCCH. Time domain lengths corresponding to PUCCH format 1, PUCCH format 3, and PUCCH format 4 each are 4 to 14 time domain symbols. Therefore, PUCCHs of PUCCH format 1, PUCCH format 3, and PUCCH format 4 each are also referred to as a long PUCCH.

In the embodiments of this application, the time domain symbol may be an orthogonal frequency division multiplexing (OFDM) symbol, or may be a single carrier-frequency division multiplexing (SC-FDM) symbol. Unless otherwise specified, all symbols in the embodiments of this application are time domain symbols.

The UCI carried on PUCCH format 0 is implicitly indicated by using a selected cyclic shift (CS). If the time domain length of PUCCH format 0 is two symbols, information on the first symbol may be repeatedly sent on the second symbol, and a frequency domain resource on the second symbol may be different from that on the first symbol.

The UCI carried on PUCCH format 1 is first modulated into a binary phase shift keying (BPSK) or quadrature phase shift keying (QPSK) modulation symbol, then multiplied by a sequence and mapped to 12 subcarriers in frequency domain, and finally extended by using an orthogonal cover code (OCC) in time domain. Different UEs may send UCI on a same time-frequency resource by using different CSs in frequency domain and/or different OCCs in time domain and by using PUCCH format 1.

The UCI carried on PUCCH format 2, PUCCH format 3, and PUCCH format 4 is first coded and modulated, and then mapped to a PUCCH resource first in frequency domain and then in time domain.

A PUCCH resource that carries an SR is configured by using signaling. The NR protocol supports a plurality of SR configurations, and different SR configurations are used to indicate that there is data to be transmitted on different logical channels of UE. The SR may be transmitted by using PUCCH format 0 or PUCCH format 1.

A PUCCH resource that carries HARQ-ACK information is usually dynamically scheduled. Both a feedback slot of HARQ-ACK information corresponding to a dynamic PDSCH and a corresponding PUCCH resource are dynamically scheduled. For a semi-persistent scheduling (SPS) PDSCH, a feedback slot of HARQ-ACK information corresponding to the semi-persistent scheduling PDSCH is indicated by using DCI, and a corresponding PUCCH resource is configured by using higher layer signaling. The HARQ-ACK information may be transmitted by using PUCCH format 0, PUCCH format 1, PUCCH format 2, PUCCH format 3, or PUCCH format 4. In the embodiments of this application, signaling may be higher layer signaling or physical layer signaling. The higher layer signaling may be RRC signaling or a medium access control (MAC) control element (CE), and the physical layer signaling may be DCI.

A PUCCH resource that carries CSI is configured by using signaling. Periodic-CSI (P-CSI) or semi-persistent-CSI (SP-CSI) may be transmitted on a PUCCH, and a corresponding PUCCH resource is configured by using higher layer signaling. Aperiodic-CSI (A-CSI) may be carried on a PUCCH (for example, a short-format PUCCH), and a corresponding PUCCH resource may be scheduled by DCI. The CSI may be transmitted by using PUCCH format 2, PUCCH format 3, or PUCCH format 4.

In an NR system, because time domain lengths of a PUCCH and a PUSCH each may be one slot or may be several symbols, a scenario in which different PUCCHs partially overlap in time domain and a scenario in which a PUCCH partially overlaps a PUSCH in time domain may occur. For the PUCCHs that overlap in time domain or the PUCCH and the PUSCH that overlap in time domain, UCI multiplexing can be performed only when a time sequence relationship defined as follows is met: UCI carried on a plurality of PUCCHs that overlap in time domain is jointly coded and then transmitted on one PUCCH or PUSCH. The time sequence relationship herein includes: a time sequence relationship 1, where if a PUCCH carries HARQ-ACK information, a distance between an earlier symbol of a symbol on the PUCCH and a symbol on a PUSCH and an end symbol on a PDSCH corresponding to the HARQ-ACK information is greater than or equal to N1+X; a time sequence relationship 2, where if a PUSCH overlaps a PUCCH in time domain, and the PUSCH is scheduled through uplink grant, a distance between an earlier symbol of a symbol on the PUCCH and a symbol on the PUSCH and an end symbol on a PDCCH corresponding to the uplink grant is greater than or equal to N2+Y; and a time sequence relationship 3, where if CSI triggered by DCI is carried on a PUCCH or a PUSCH, a distance between an earlier symbol of a symbol on the PUCCH and a symbol on the PUSCH and an end symbol on a PDCCH in which the DCI that triggers the CSI is located is greater than or equal to Z+d. Values of N1 and N2 are related to a subcarrier spacing (SCS) and a UE capability. Values of X and Y are related to a plurality of factors such as a time domain configuration of the PDSCH, and whether the HARQ-ACK information needs to be transmitted on the PUSCH. Values of Z and d are related to factors such as the subcarrier spacing. Specific values of N1, N2, X, Y, Z, and d may be predefined. In the embodiment of this application, unless otherwise specified, it is assumed that resources of channels required for multiplex transmission meet the time sequence relationship 1, the time sequence relationship 2, and the time sequence relationship 3.

Figure 2:
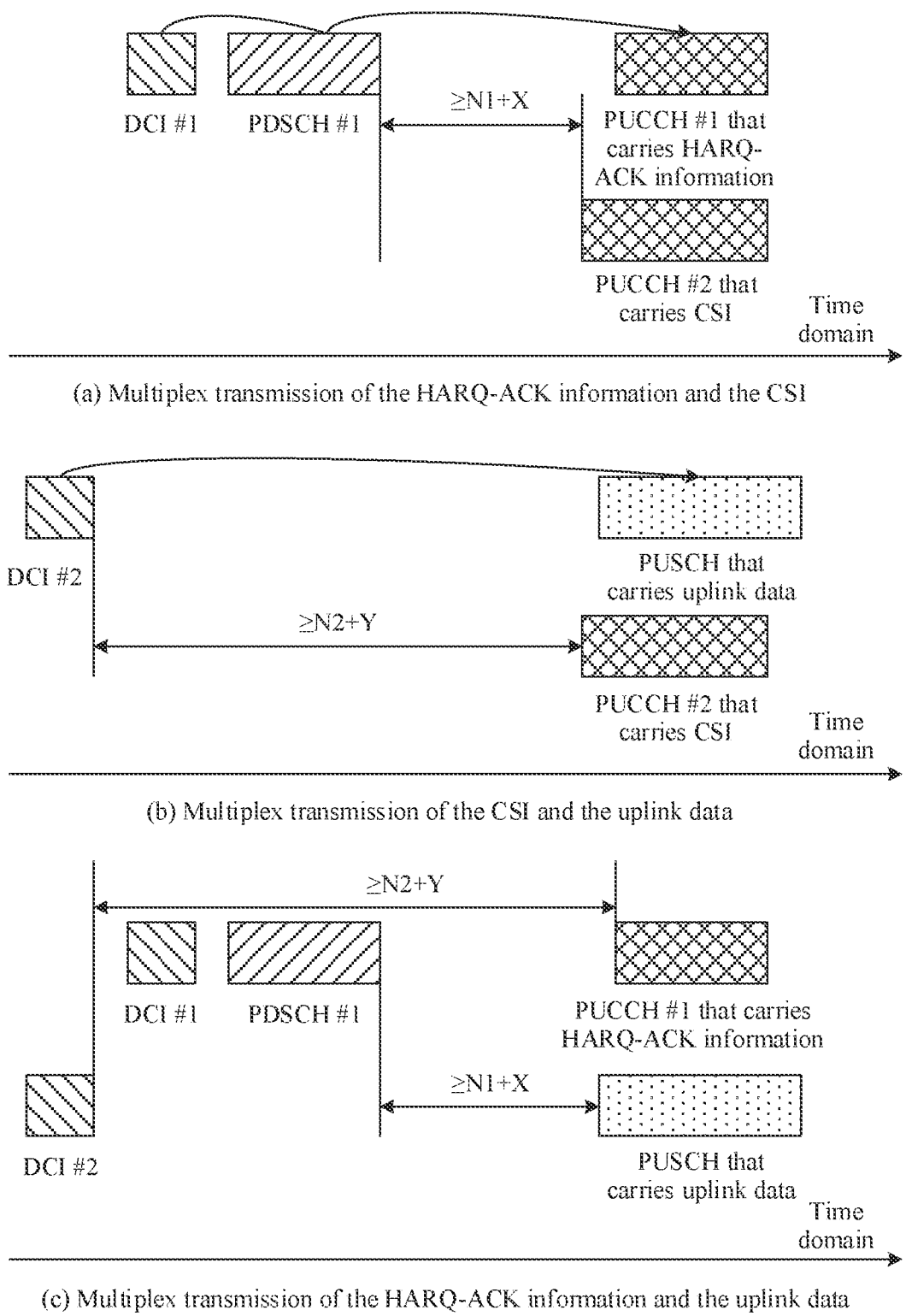
FIG. 2 shows a control information multiplex transmission scenario to which an embodiment of this application is applied.

As shown in a part (a) in FIG. 2, the PUCCH #1 partially overlaps the PUCCH #2. When a distance between the first symbol on the PUCCH #2 and the last symbol on a PDSCH #1 is greater than or equal to N1+X, HARQ-ACK information carried on the PUCCH #1 and CSI carried on the PUCCH #2 may be jointly coded and then multiplexed for transmission. The PDSCH #1 is scheduled by DCI #1, and the HARQ-ACK information carried on the PUCCH #1 is acknowledgement information of downlink data transmitted on the PDSCH #1, so that the base station learns whether the PDSCH #1 is correctly received by the UE. As shown in a part (b) in FIG. 2, the PUCCH #2 partially overlaps the PUSCH. When a distance between the first symbol on the PUCCH #2 and the last symbol on DCI #2 is greater than or equal to N2+Y, the CSI carried on the PUCCH #2 and uplink data carried on the PUSCH may be multiplexed for transmission. The PUSCH is scheduled by the DCI #2. As shown in a part (c) in FIG. 2, the PUCCH #1 partially overlaps the PUSCH. When a distance between the first symbol on the PUSCH and the last symbol on the PDSCH #1 is greater than or equal to N1+X, and when a distance between the first symbol on the PUCCH #1 and the last symbol on the DCI #2 is greater than or equal to N2+Y, the HARQ-ACK information carried on the PUCCH #1 and the uplink data carried on the PUSCH may be multiplexed for transmission. In the embodiments of this application, multiplex transmission means that two or more pieces of information are multiplexed on a resource of a same channel for transmission, and the two or more pieces of information that are multiplexed for transmission may be jointly coded or may not be jointly coded.

Multiplex Transmission of an SR and CSI

When a PUCCH resource that carries an SR overlaps a PUCCH resource that carries CSI in time domain, if the CSI is not A-CSI triggered by DCI, it does not need to determine whether the foregoing time sequence relationships are met, an SR bit is directly added to the end of a CSI bit for joint coding, and then information obtained after the joint coding is transmitted on the PUCCH resource that carries the CSI. If the CSI is A-CSI triggered by DCI, the foregoing time sequence relationship 3 needs to be met, so that an SR bit can be added to the end of a CSI bit for joint coding, and then information obtained after the joint coding is transmitted on the PUCCH resource that carries the CSI. When K types of SR configuration resources corresponding to a plurality of SRs all overlap the PUCCH resource that carries the CSI, $\lceil \log_2(K+1) \rceil$ bits may be added to the end of the CSI bit, where K is a positive integer, and $\lceil\ \rceil$ indicates rounding up.

Multiplex Transmission of an SR and HARQ-ACK Information

When a PUCCH resource that carries an SR overlaps a PUCCH resource that carries HARQ-ACK information, the SR and the HARQ-ACK information can be multiplexed for transmission only when the foregoing time sequence relationship 1 is met. (1) When a format of a PUCCH that carries the HARQ-ACK information is format 2, format 3, or format 4, the UE may add an SR bit to the end of a HARQ-ACK bit for joint coding, and bit information obtained after the joint coding is carried on the PUCCH resource corresponding to the HARQ-ACK information for transmission. When K types of SR configuration resources corresponding to a plurality of SRs all overlap the PUCCH resource that carries the HARQ-ACK information, $\lceil \log_2(K+1) \rceil$ bits may be added to the end of the HARQ-ACK bit. (2) When a format of a PUCCH that carries the HARQ-ACK information is format 0, the UE may implicitly indicate a state of the SR by changing a CS parameter of the PUCCH that carries the HARQ-ACK information. For example, for 1-bit HARQ-ACK information, an original value of the CS parameter is 0 or 6, and if the state of the SR is positive, the value of the CS parameter may be changed to 3 or 9. When K types of SR configuration resources corresponding to a plurality of SRs all overlap the PUCCH resource that carries the HARQ-ACK information, as long as a state of one SR is positive, the UE determines the CS parameter of the PUCCH based on the positive state. (3) When a format of a PUCCH that carries the HARQ-ACK information and a format of a PUCCH that carries the SR each are format 1, the UE may perform a resource selection: If a state of the SR is negative, the UE chooses to transmit the HARQ-ACK information on the PUCCH resource corresponding to the HARQ-ACK information; or if a state of the SR is positive, the UE chooses to transmit the HARQ-ACK information on the PUCCH resource corresponding to the SR. (4) When a format of a PUCCH that carries the HARQ-ACK information is format 1, and a format of a PUCCH that carries the SR is format 0, the UE discards the SR.

Multiplex Transmission of CSI and HARQ-ACK Information

When a PUCCH resource that carries CSI overlaps a PUCCH resource that carries HARQ-ACK information, the foregoing time sequence relationship 1 needs to be met. In addition, if the CSI is A-CSI triggered by DCI, the foregoing time sequence relationship 3 further needs to be met, so that the CSI and the HARQ-ACK can be multiplexed for transmission. The UE may jointly code a CSI part 1 and the HARQ-ACK information, and separately code a CSI part 2. For HARQ-ACK information corresponding to a dynamically scheduled PDSCH, jointly coded information is transmitted on a PUCCH resource corresponding to the HARQ-ACK information. For HARQ-ACK information corresponding to an SPS PDSCH, jointly coded information is transmitted on a PUCCH resource corresponding to CSI. Because determining of the PUCCH resource corresponding to the HARQ-ACK is related to a payload size of UCI, the payload of the jointly coded UCI may change, and consequently, the PUCCH resource corresponding to the HARQ-ACK information may change. Definitions of the CSI part 1 and the CSI part 2 in existing technical specifications in the 3GPP are not described in detail herein.

Multiplex Transmission of UCI and Uplink Data

When a PUCCH that carries HARQ-ACK information overlaps a PUSCH, the time sequence relationship 1 and the time sequence relationship 2 need to be met. In addition, if the PUSCH carries A-CSI triggered by DCI, the time sequence relationship 3 further needs to be met, so that the UE can multiplex the HARQ-ACK information with uplink data for transmission, that is, transmit the HARQ-ACK information by using a PUSCH resource. When a PUCCH that carries CSI overlaps the PUSCH, the time sequence relationship 2 needs to be met. In addition, if the PUCCH or the PUSCH carries A-CSI triggered by DCI, the time sequence relationship 3 further needs to be met, so that the UE can multiplex the CSI with uplink data for transmission, that is, transmit the CSI by using a PUSCH resource. That the HARQ-ACK information or the CSI is transmitted by using the PUSCH resource may also be referred to as that UCI is carried on the PUSCH for transmission. If a PUCCH that carries an SR overlaps the PUSCH, the UE may discard SR information. In other words, the SR and uplink data are not multiplexed for transmission, and the PUCCH is not sent.

In a scenario in which the HARQ-ACK information and the uplink data are multiplexed for transmission, if the PUSCH is scheduled by DCI format 0_1, the base station needs to indicate an uplink DAI in the DCI, to determine a HARQ-ACK codebook. To further determine a resource that needs to be used to carry the HARQ-ACK information on the PUSCH, the base station may configure a beta offset of the HARQ-ACK information by using signaling. In a scenario in which the CSI and the uplink data are multiplexed for transmission, to determine a resource that needs to be used to carry the CSI part 1 and the CSI part 2 on the PUSCH, the base station may configure a beta offset of the CSI part 1 and the CSI part 2 by using signaling.

For a scenario shown in FIG. 3, an embodiment of this application provides a method for multiplexing uplink control information for transmission. As shown in FIG. 3, a PUCCH #1 that carries HARQ-ACK information #1 does not overlap a PUCCH #2 that carries HARQ-ACK information #2 in time domain, a PUCCH #3 that carries an SR or CSI overlaps both the PUCCH #1 and the PUCCH #2, and the three PUCCHs are located in a same time unit, for example, in one slot. In the embodiments of this application, terms of "first HARQ-ACK information" and "HARQ-ACK information #1" may be interchanged, "second HARQ-ACK information" and "HARQ-ACK information #2" may be interchanged, "resource of a first uplink control channel" and "PUCCH #1" may be interchanged, "resource of a second uplink control channel" and "PUCCH #2" may be interchanged, and "resource of a third uplink control channel" and "PUCCH #3" may be interchanged. "HARQ-ACK information" and "HARQ-ACK codebook" may also be interchanged when there is no strict distinction.

It may be understood that, in the embodiments of this application, a PDSCH, a PDCCH, a PUSCH, and a PUCCH are merely used as examples of a downlink data channel, a downlink control channel, an uplink data channel, and an uplink control channel. In different systems and different scenarios, the data channel and the control channel may have different names, and this is not limited in the embodiments of this application.

Unless otherwise specified, the uplink data channel in the embodiments of this application may be an uplink data channel that is dynamically scheduled by DCI, or may be an uplink data channel in which transmission is performed through configured grant. The configured grant is also referred to as grant free.

FIG. 4 shows a processing process of uplink control information multiplex transmission according to an embodiment of this application. The method may be performed by a base station, or may be performed by a function module in a base station, for example, a chip in the base station. The method may also be performed by UE, or may be performed by a function module in UE, for example, a chip in the UE. For ease of description, the following uses an example in which the method is performed by the UE and the base station for description.

S410: Determine a resource of a first uplink control channel, where the first uplink control channel is used to carry first HARQ-ACK information, the first HARQ-ACK information is used to indicate whether a first downlink data channel set is correctly decoded, and the first downlink data channel set includes at least one downlink data channel.

S420: Determine a resource of a second uplink control channel, where the second uplink control channel is used to carry second HARQ-ACK information, the second HARQ-ACK information is used to indicate whether a second downlink data channel set is correctly decoded, the second downlink data channel set includes at least one downlink data channel, the second downlink data channel set is different from the first downlink data channel set, and the resource of the second uplink control channel does not overlap the resource of the first uplink control channel in time domain.

S430: Determine a resource of a third uplink control channel, where the third uplink control channel is used to carry first UCI, the first UCI includes CSI or an SR, and the resource of the third uplink control channel overlaps the resource of the first uplink control channel and the resource of the second uplink control channel in time domain. For example, the resource of the first uplink control channel may correspond to a transmission resource of the PUCCH #1 in FIG. 3, the resource of the second uplink control channel may correspond to a transmission resource of the PUCCH #2 in FIG. 3, and the resource of the third uplink control channel may correspond to a transmission resource of the PUCCH #3 in FIG. 3.

For how the UE determines the resource of the first uplink control channel, the resource of the second uplink control channel, and the resource of the third uplink control channel, refer to the foregoing description of the method for determining the PUCCH resource or refer to the method for determining the PUCCH resource in the conventional technology. This is not limited in this application.

The base station may determine the resource of the first uplink control channel, the resource of the second uplink control channel, and the resource of the third uplink control channel according to a scheduling policy and based on a resource allocation algorithm. How the base station specifically determines the resources of the three control channels is not limited in this application.

S440: Determine a resource of a fourth uplink control channel, where the fourth uplink control channel is used to carry third HARQ-ACK information and the first UCI, the third HARQ-ACK information is the first HARQ-ACK information or the second HARQ-ACK information, and the third HARQ-ACK information is determined based on a format of the first uplink control channel, a format of the second uplink control channel, and a format of the third uplink control channel, or the third HARQ-ACK information is HARQ-ACK information that meets a first condition and that is either the first HARQ-ACK information or the second HARQ-ACK information.

A 5G mobile communications system may support an enhanced mobile broadband (eMBB) service, an ultra-reliable and low-latency communications (URLLC) service, and a massive machine type communications (mMTC) service. The 5G system has different transmission latency and transmission reliability requirements on UCI corresponding to different service types. UCI corresponding to a same service type is multiplexed for transmission, to separately meet different transmission latency and transmission reliability requirements of the system on the UCI. For example, a service type corresponding to the first HARQ-ACK information is URLLC, and a service type corresponding to the second HARQ-ACK information is eMBB. If a service type corresponding to the SR is URLLC, the first HARQ-ACK information is selected as the third HARQ-ACK information for multiplexing with the SR for transmission. If a service type corresponding to the SR is eMBB, the second HARQ-ACK information is selected as the third HARQ-ACK information for multiplexing with the SR for transmission. In the multiplex transmission method, impact of HARQ-ACK information of eMBB service data on a transmission latency and transmission reliability of HARQ-ACK information of URLLC service data is avoided.

The base station and the UE may determine, by using an indirect determining method, whether the service types are the same. For example, whether the service types are the same may be determined by determining whether the HARQ-ACK information, the CSI, and the SR meet a specific condition. The first condition is used to indirectly determine whether the service types corresponding to the first HARQ-ACK information and the second HARQ-ACK information are the same as a service type corresponding to the first UCI.

When the first UCI includes the CSI, the first condition may be: the third HARQ-ACK information meets a second condition, and the CSI meets a third condition; or the third HARQ-ACK information does not meet a second condition, and the CSI does not meet a third condition. When the third HARQ-ACK information meets the second condition, it may be considered that a service type corresponding to the third HARQ-ACK information is URLLC. When the CSI meets the third condition, it may be considered that a service type corresponding to the CSI is URLLC.

When the first UCI includes the SR, the first condition in S440 may be: the third HARQ-ACK information meets a second condition, and the SR meets a fourth condition; or the third HARQ-ACK information does not meet a second condition, and the SR does not meet a fourth condition. When the SR meets the fourth condition, it may be considered that the service type corresponding to the SR is URLLC.

Optionally, the second condition is: a modulation and coding scheme (MCS) table used for downlink data transmission corresponding to the third HARQ-ACK information is a first MCS table, where the first MCS table may be one of a plurality of MCS tables configured by using higher layer signaling for downlink data transmission, and spectral efficiency corresponding to a smallest MCS index in the first MCS table is the smallest in the plurality of MCS tables; or DCI for scheduling a downlink data channel corresponding to the third HARQ-ACK information includes a first field, where a value of the first field is a first preset value, the first preset value may be configured by using higher layer signaling or predefined, and the first preset value may indicate that a downlink data channel scheduled by the DCI carries low-latency and ultra-reliable data; or a format of DCI for scheduling a downlink data channel corresponding to the third HARQ-ACK information is a first DCI format, where the first DCI format may be configured by using higher layer signaling or predefined, and a payload size corresponding to the first DCI format may be a smallest payload size in all DCI formats; or a control resource set (CORESET) in which DCI for scheduling a downlink data channel corresponding to the third HARQ-ACK information is located belongs to a first CORESET set, where the first CORESET set may be configured by using higher layer signaling or predefined; or a search space (SS) in which DCI for scheduling a downlink data channel corresponding to the third HARQ-ACK information is located belongs to a first SS set, where the first SS set may be configured by using higher layer signaling or predefined. The plurality of conditions may be separately used as the second condition, or may be combined as the second condition. This is not limited herein. In this embodiment of this application, the predefinition may be predefined by a system or predefined in a protocol, for example, predefined in an NR protocol in the 3GPP.

A method for determining, by the UE, the MCS table used for the downlink data transmission may be one of the following methods: (a) When DCI for scheduling a PDSCH is not fallback DCI, for example, the DCI for scheduling the PDSCH is in DCI format 1_1 defined in the NR protocol, and when the DCI for scheduling the PDSCH is scrambled by using a first radio network temporary identifier (RNTI), for example, the DCI for scheduling the PDSCH is scrambled by using an MCS-C-RNTI defined in the NR protocol, an MCS table corresponding to the PDSCH is the first MCS table. (b) When a value of a first parameter corresponding to a PDSCH is a second preset value, for example, a value of an RRC parameter "mcs-table" in the NR protocol is "qam64LowSE", an MCS table corresponding to the PDSCH is the first MCS table.

Optionally, the third condition is: a channel quality indicator (CQI) table corresponding to the CSI is a first CQI table, where the first CQI table may be one of a plurality of CQI tables configured by using higher layer signaling for channel quality feedback, spectral efficiency corresponding to a valid smallest CQI index in the first CQI table is the smallest in the plurality of CQI tables, and a valid CQI index indicates that the CQI index corresponds to spectral efficiency; or the CSI is aperiodic-CSI carried on an uplink control channel; or a target block error rate (BLER) associated with the first CQI table is the smallest in the plurality of CQI tables; or the CSI is A-CSI that is carried on a PUCCH and that is triggered by DCI; or the CSI is A-CSI that is carried on a short-format PUCCH and that is triggered by DCI for scheduling downlink data transmission; or the CSI is A-CSI that is triggered by DCI and whose feedback latency is less than or equal to a third threshold, and the third threshold may be configured by using higher layer signaling or predefined. Optionally, the fourth condition is: an SR configuration corresponding to the SR belongs to a first SR configuration set, where the first SR configuration set may be configured by using higher layer signaling or predefined; or a priority of a logical channel associated with an SR configuration corresponding to the SR is greater than or equal to a first threshold, where the first threshold may be configured by using higher layer signaling or predefined; or a periodicity of the SR is less than or equal to a second threshold, where the second threshold may be configured by using higher layer signaling or predefined, for example, the second threshold may be two symbols; or an SR configuration index identifier (ID) corresponding to the SR is less than or equal to a fourth threshold; or an SR configuration index corresponding to the SR is greater than or equal to a fifth threshold; or a logical channel group ID associated with an SR configuration corresponding to the SR is less than or equal to a sixth threshold; or a logical channel group ID associated with an SR configuration corresponding to the SR is greater than or equal to a seventh threshold; or a logical channel ID associated with an SR configuration corresponding to the SR is less than or equal to an eighth threshold; or a logical channel ID associated with an SR configuration corresponding to the SR is greater than or equal to a ninth threshold; or a time domain length of an uplink control channel that carries the SR is less than or equal to a tenth threshold. The fourth threshold to the tenth threshold may be configured by using higher layer signaling or predefined.

As an alternative solution of S440, the UE may directly perform joint coding on the first HARQ-ACK information, the second HARQ-ACK information, and the first UCI. Optionally, when the first uplink control channel, the second uplink control channel, and the third uplink control channel each are in format 1, the UE may directly perform joint coding on the first HARQ-ACK information, the second HARQ-ACK information, and the first UCI. Optionally, when the third uplink control channel is in format 0 or 1, and at least one of the first uplink control channel and the second uplink control channel is in format 0 or 1, the UE may directly perform joint coding on the first HARQ-ACK information, the second HARQ-ACK information, and the first UCI. When the UE directly performs joint coding on the first HARQ-ACK information, the second HARQ-ACK information, and the first UCI, the UE determines an uplink control channel resource set based on a total quantity of bits of the first HARQ-ACK information, the second HARQ-ACK information, and the first UCI, and then determines, based on a PRI field in the last DCI corresponding to the first HARQ-ACK information and the second HARQ-ACK information, the resource of the fourth uplink control channel from the uplink control channel resource set, to transmit the first HARQ-ACK information, the second HARQ-ACK information, and the first UCI.

S450a: When the third HARQ-ACK information is the first HARQ-ACK information, the resource of the fourth uplink control channel may be determined by using at least one of the following methods: (1) When the format of the first uplink control channel and the format of the third uplink control channel each are format 0, the resource of the fourth uplink control channel is determined as the resource of the first uplink control channel. (2) When the format of the first uplink control channel and the format of the third uplink control channel each are format 1, the resource of the fourth uplink control channel is determined as the resource of the first uplink control channel or the resource of the third uplink control channel. (3) When the format of the first uplink control channel is format 2, format 3, or format 4, the resource of the fourth uplink control channel is determined based on a total quantity of bits of the first HARQ-ACK information and the first UCI. (4) When the format of the third uplink control channel is format 2, format 3, or format 4, the resource of the fourth uplink control channel is determined based on a total quantity of bits of the first HARQ-ACK information and the first UCI.

It may be understood that the foregoing merely uses an example in which the third HARQ-ACK information is the first HARQ-ACK information to describe the method for determining the resource of the fourth uplink control channel. When the third HARQ-ACK information is the second HARQ-ACK information, the method is similar. Details are not described again.

The following describes in detail a method for determining the third HARQ-ACK information and a multiplex transmission method based on different scenarios.

S441: When the third HARQ-ACK information is determined based on the format of the first uplink control channel, the format of the second uplink control channel, and the format of the third uplink control channel, a specific determining method may be: When the format of the first uplink control channel is format 0, the format of the second uplink control channel is format 1, and the format of the third uplink control channel is format 0, the third HARQ-ACK information is determined as the first HARQ-ACK information; and/or when the format of the first uplink control channel is format 2, format 3, or format 4, the format of the second uplink control channel is format 1, and the format of the third uplink control channel is format 0 or format 1, the third HARQ-ACK information is determined as the first HARQ-ACK information.

Scenario 3-1

The format of the first uplink control channel, the format of the second uplink control channel, and the format of the third uplink control channel each are format 1. The first UCI is an SR.

In the conventional technology, because the resource of the first uplink control channel overlaps the resource of the third uplink control channel, and control channel formats used by the resources of the two control channels each are format 1, the UE may perform a resource selection: If a state of the SR is negative, the UE chooses to transmit HARQ-ACK information on a PUCCH resource corresponding to the HARQ-ACK information; or if a state of the SR is positive, the UE chooses to transmit HARQ-ACK information on a PUCCH resource corresponding to the SR. Therefore, in the scenario 3-1, when the state of the SR is positive, the UE first performs the resource selection, and sends the first HARQ-ACK information on the resource of the third uplink control channel, and then the first HARQ-ACK information cannot be multiplexed with the second HARQ-ACK information on the resource of the second uplink control channel. Either the first HARQ-ACK information or the second HARQ-ACK information is discarded. To resolve the problem in this scenario, this embodiment of this application provides the following solution.

S442: Select HARQ-ACK information to be carried by an uplink control channel resource whose start symbol is earlier than that of another resource as the third HARQ-ACK information to be multiplexed with the SR for transmission, to avoid impact of HARQ-ACK information to be carried by an uplink control channel resource whose start symbol is later than that of another resource on a transmission latency of the HARQ-ACK information whose start symbol is located before another resource. As shown in FIG. 3, a start symbol on the PUCCH #1 is located before that on the PUCCH #2. Therefore, the HARQ-ACK information #1 is selected as the third HARQ-ACK information, thereby ensuring timely transmission of the HARQ-ACK information #1. Optionally, the UE may select, according to S440, the HARQ-ACK information that meets the first condition as the third HARQ-ACK information to be multiplexed with the SR for transmission.

S450b: Further, determine the resource of the fourth uplink control channel based on a total quantity of bits of the third HARQ-ACK information and the SR. Specifically, an uplink control channel resource set is first determined based on the total quantity of bits of the third HARQ-ACK information and the SR, and then based on the PRI field in the last DCI corresponding to the third HARQ-ACK information, the resource of the fourth uplink control channel resource is selected from the uplink control channel resource set, to carry the third HARQ-ACK information and the SR. A quantity of bits of the SR may be 1, or may be $\lceil \log_2(K+1) \rceil$, where K is a quantity of SR configurations corresponding to an SR overlapping the third HARQ-ACK information, K is a positive integer, and $\lceil \ \rceil$ indicates rounding up.

Without loss of generality, it is assumed that the third HARQ-ACK information is the first HARQ-ACK information.

S460a: In a possible implementation, the base station performs resource scheduling, so that the resource of the fourth uplink control channel does not overlap the resource of the second uplink control channel in time domain. In this case, the UE may send the first HARQ-ACK information and the first UCI on the resource of the fourth uplink control channel, and send the second HARQ-ACK information on the resource of the second uplink control channel. Correspondingly, the base station receives the first HARQ-ACK information and the first UCI on the resource of the fourth uplink control channel, and receives the second HARQ-ACK information on the resource of the second uplink control channel.

S460b: In another possible implementation, a resource scheduling algorithm of the base station does not ensure that the resource of the fourth uplink control channel does not overlap the resource of the second uplink control channel in time domain.

When the resource of the fourth uplink control channel does not overlap the resource of the second uplink control channel, the UE sends the first HARQ-ACK information and the first UCI on the resource of the fourth uplink control channel, and sends the second HARQ-ACK information on the resource of the second uplink control channel. Correspondingly, the base station receives the first HARQ-ACK information and the first UCI on the resource of the fourth uplink control channel, and receives the second HARQ-ACK information on the resource of the second uplink control channel.

When the resource of the fourth uplink control channel overlaps the resource of the second uplink control channel, one of the following plurality of multiplex transmission methods may be selected:

(1) The UE sends the first HARQ-ACK information, the second HARQ-ACK information, and the first UCI on a resource of a fifth uplink control channel, where the resource of the fifth uplink control channel is determined based on a total quantity of bits of the first HARQ-ACK information, the second HARQ-ACK information, and the first UCI. For a method for determining the resource of the fifth uplink control channel, refer to the method for determining the resource of the fourth uplink control channel. Correspondingly, the base station receives the first HARQ-ACK information, the second HARQ-ACK information, and the first UCI on the resource of the fifth uplink control channel.

(2) When the first UCI includes the CSI, when the first HARQ-ACK information meets the second condition and the CSI meets the third condition, the UE discards the second HARQ-ACK information, the UE sends the first HARQ-ACK information and the first UCI to the base station on the resource of the fourth uplink control channel, and the UE skips sending the second HARQ-ACK information on the resource of the second uplink control channel; or when the first HARQ-ACK information meets the second condition and the CSI does not meet the third condition, the UE discards the first UCI, the UE sends the first HARQ-ACK information to the base station on the resource of the first uplink control channel and sends the second HARQ-ACK information to the base station on the resource of the second uplink control channel, and the UE skips sending the first UCI to the base station on the resource of the third uplink control channel.

(3) When the first UCI includes the SR, when the first HARQ-ACK information meets the second condition and the SR meets the fourth condition, the UE discards the second HARQ-ACK information, the UE sends the first HARQ-ACK information and the first UCI to the base station on the resource of the fourth uplink control channel, and the UE skips sending the second HARQ-ACK information on the resource of the second uplink control channel; or when the first HARQ-ACK information meets the second condition and the SR does not meet the fourth condition, the UE discards the first UCI, the UE sends the first HARQ-ACK information to the base station on the resource of the first uplink control channel and sends the second HARQ-ACK information to the base station on the resource of the second uplink control channel, and the UE skips sending the first UCI to the base station on the resource of the third uplink control channel.

(4) The UE sends the first HARQ-ACK information and a part of the first UCI to the base station on the resource of the first uplink control channel and sends the second HARQ-ACK information to the base station on the resource of the second uplink control channel, and the UE skips sending the first UCI on the resource of the third uplink control channel. The part of the first UCI herein needs to meet: uplink control channel resource sets determined by a quantity of bits of the first HARQ-ACK information and a total quantity of bits of the first HARQ-ACK information and the part of the first UCI are the same. The UE may select, based on a priority of information in the first UCI, a part of UCI with a higher priority to be multiplexed with the first HARQ-ACK information for transmission.

Scenario 3-2

The format of the first uplink control channel is format 0, the format of the second uplink control channel is format 1, and the format of the third uplink control channel is format 0 or format 1. The first UCI is an SR.

If the first UCI is preferentially multiplexed with the second HARQ-ACK information for transmission, the following problems occur: (1) When the format of the third uplink control channel is format 1, if a state of the SR is positive, the UE performs resource selection, the UE sends the second HARQ-ACK information on the resource of the third uplink control channel, and the second HARQ-ACK information cannot be multiplexed with the first HARQ-ACK information. The first HARQ-ACK information or the first UCI and the second HARQ-ACK information is/are discarded. (2) When the format of the third uplink control channel is format 0, the SR is discarded.

To resolve the problem in this scenario, this embodiment of this application provides the following method.

The first UCI is preferably multiplexed with the first HARQ-ACK information for transmission; to be specific, the third HARQ-ACK information is the first HARQ-ACK information. The UE may implicitly indicate the state of the SR by changing a CS parameter of the resource of the first uplink control channel that carries the first HARQ-ACK information. The UE sends the first HARQ-ACK information and the first UCI to the base station on the resource of the first uplink control channel, and sends the second HARQ-ACK information to the base station on the resource of the second uplink control channel.

Optionally, the third HARQ-ACK information is the first HARQ-ACK information or the second HARQ-ACK information. The UE determines the resource of the fourth uplink control channel according to S450b and based on a total quantity of bits of the third HARQ-ACK information and the SR, and skips discarding the SR or the HARQ-ACK information.

Scenario 3-3

The format of the first uplink control channel is format 2, format 3, or format 4, the format of the second uplink control channel is format 0 or format 1, and the format of the third uplink control channel is format 0 or format 1. The first UCI is an SR.

The UE multiplexes the first UCI with the first HARQ-ACK information for transmission; to be specific, determines the third HARQ-ACK information as the first HARQ-ACK information. For a specific method for multiplexing the third HARQ-ACK information with the first UCI, refer to the related description of multiplexing the HARQ-ACK information with the SR for transmission. For a method for determining the resource of the fourth uplink control channel, refer to the related descriptions in S450a and S450b.

After the resource of the fourth uplink control channel is determined, for a specific method for sending the uplink control information, refer to the related descriptions in S460a and S460b.

Scenario 3-4

URLLC service data is transmitted on a PDSCH corresponding to the first HARQ-ACK information, eMBB service data is transmitted on a PDSCH corresponding to the second HARQ-ACK information, and the first UCI is an SR or CSI corresponding to the eMBB service data.

According to the method for determining the third HARQ-ACK information provided in S440, the third HARQ-ACK information is HARQ-ACK information that meets the first condition and that is either the first HARQ-ACK information or the second HARQ-ACK information, and it can be learned that the third HARQ-ACK information is the second HARQ-ACK information. The UE uses the second HARQ-ACK information as the third HARQ-ACK information to be multiplexed with the first UCI on the resource of the fourth uplink control channel to send to the base station. For a specific method for multiplexing the third HARQ-ACK information with the first UCI, refer to the related descriptions of multiplexing the HARQ-ACK information with the SR for transmission and multiplexing the HARQ-ACK information with the CSI for transmission. For a method for determining the resource of the fourth uplink control channel, refer to the related descriptions in S450a and S450b.

After the resource of the fourth uplink control channel is determined, for a specific method for sending the uplink control information, refer to the related descriptions in S460a and S460b.

Scenario 3-5

URLLC service data is transmitted on a PDSCH corresponding to the first HARQ-ACK information, eMBB service data is transmitted on a PDSCH corresponding to the second HARQ-ACK information, and the first UCI is an SR or CSI corresponding to the URLLC service data.

According to the method for determining the third HARQ-ACK information provided in S440, the third HARQ-ACK information is HARQ-ACK information that meets the first condition and that is either the first HARQ-ACK information or the second HARQ-ACK information, and it can be learned that the third HARQ-ACK information is the first HARQ-ACK information. The UE uses the first HARQ-ACK information as the third HARQ-ACK information to be multiplexed with the first UCI on the resource of the fourth uplink control channel to send to the base station. For a specific method for multiplexing the third HARQ-ACK information with the first UCI, refer to the related descriptions of multiplexing the HARQ-ACK information with the SR for transmission and multiplexing the HARQ-ACK information with the CSI for transmission. For a method for determining the resource of the fourth uplink control channel, refer to the related descriptions in S450a and S450b.

After the resource of the fourth uplink control channel is determined, for a specific method for sending the uplink control information, refer to the related descriptions in S460a and S460b.

Figure 5:
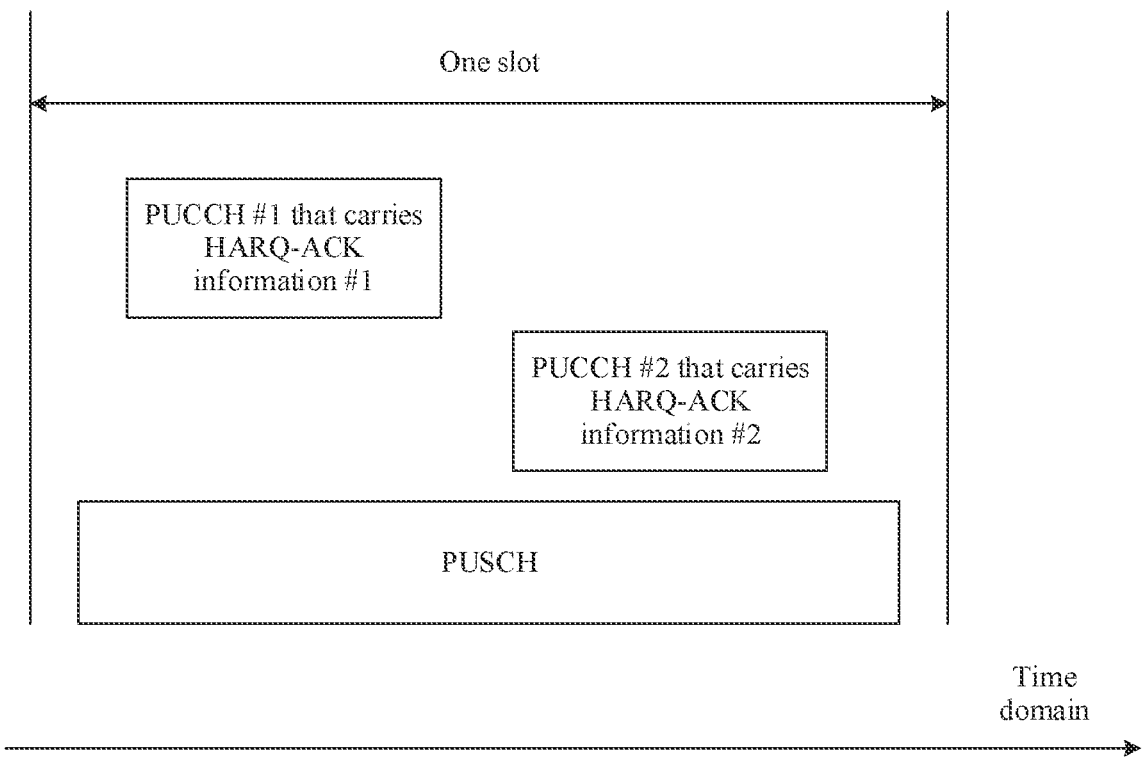
FIG. 5 shows still another control information multiplex transmission scenario to which an embodiment of this application is applied.

FIG. 5 is another uplink control information multiplex transmission application scenario according to an embodiment of this application. As shown in FIG. 5, a PUCCH #1 that carries HARQ-ACK information #1 does not overlap a PUCCH #2 that carries HARQ-ACK information #2 in time domain, a PUSCH that carries data overlaps both the PUCCH #1 and the PUCCH #2, and the PUSCH and the two PUCCHs are located in a same time unit, for example, in one slot.

In the scenario shown in FIG. 5, UE may multiplex both the HARQ-ACK information #1 and the HARQ-ACK information #2 on the PUSCH for transmission. Considering that the HARQ-ACK information #1 and the HARQ-ACK information #2 may have different reliability and latency requirements, for example, the HARQ-ACK information #1 is HARQ-ACK information corresponding to a URLLC service, and the HARQ-ACK information #2 is HARQ-ACK information corresponding to an eMBB service, an intuitive method is to map the two pieces of HARQ-ACK information separately. However, when a PUSCH resource is scheduled by DCI format 0_1 to carry the HARQ-ACK information, PUCCH format 0_1 includes only one DAI field and one beta offset field, and cannot separately indicate DAIs and beta offsets of the HARQ-ACK information #1 and the HARQ-ACK information #2. Therefore, different transmission resources cannot be determined for the HARQ-ACK information #1 and the HARQ-ACK information #2, and different latency and reliability requirements of the HARQ-ACK information #1 and the HARQ-ACK information #2 cannot be met.

Figure 6:
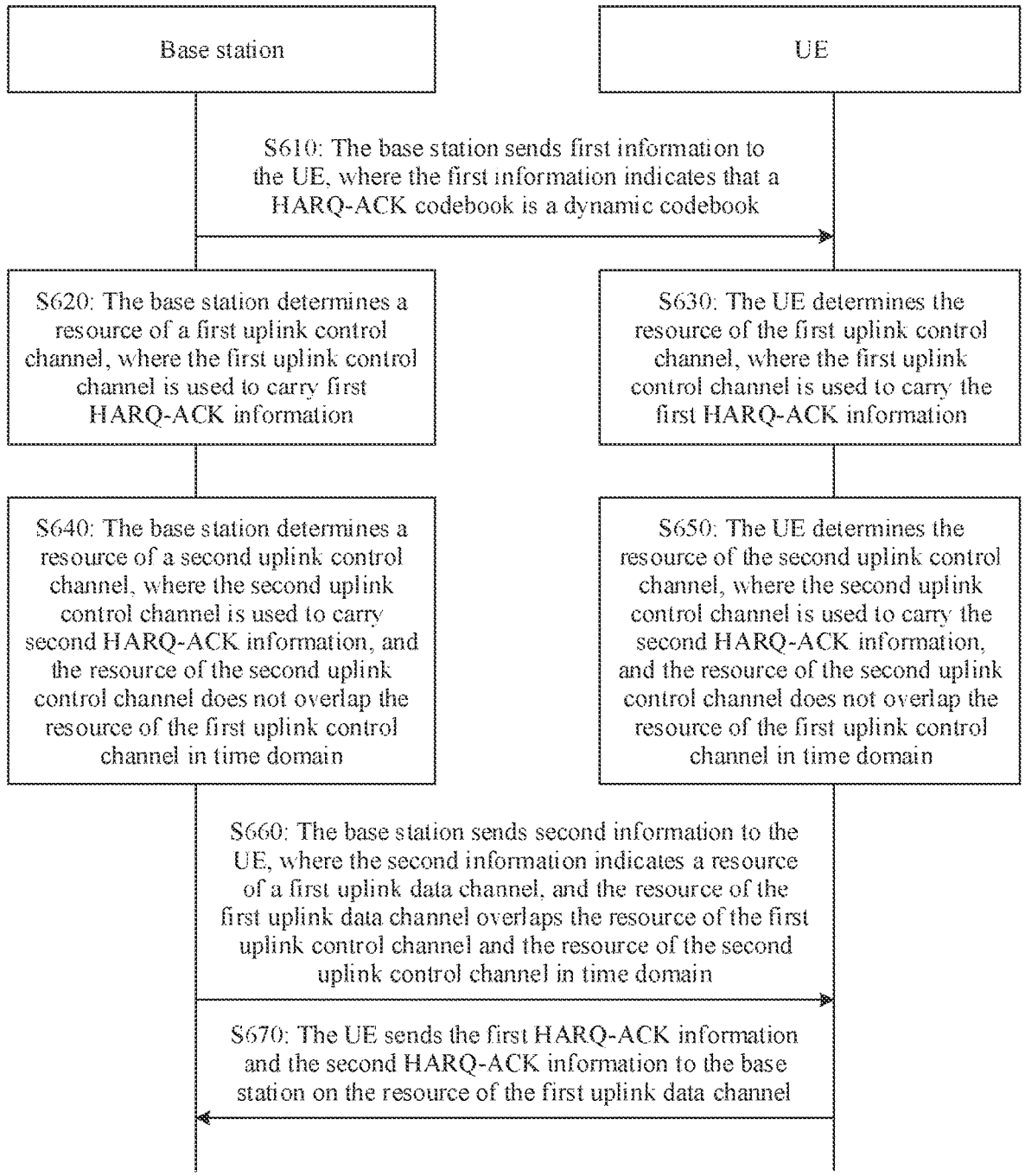
FIG. 6 is a schematic diagram of another processing process of uplink control information multiplex transmission according to an embodiment of this application.

FIG. 6 shows another processing process of a method for multiplexing uplink control information for transmission according to an embodiment of this application. The method may be performed by a base station and UE, or may be performed by a function module in a base station and a function module in UE, for example, a chip in the base station and a chip in the UE. For ease of description, the following uses an example in which the method is performed by the UE and the base station for description.

S610: The base station sends first information to the UE, where the first information indicates that a HARQ-ACK codebook is a dynamic codebook. Correspondingly, the UE receives the first information that is from the base station.

S620: The base station determines a resource of a first uplink control channel, where the first uplink control channel is used to carry first HARQ-ACK information, the first HARQ-ACK information is used to indicate whether a first downlink data channel set is correctly decoded, and the first downlink data channel set includes at least one downlink data channel.

S630: The UE determines the resource of the first uplink control channel, where the first uplink control channel is used to carry the first HARQ-ACK information.

S640: The base station determines a resource of a second uplink control channel, where the second uplink control channel is used to carry second HARQ-ACK information, the second HARQ-ACK information is used to indicate whether a second downlink data channel set is correctly decoded, the second downlink data channel set includes at least one downlink data channel, the second downlink data channel set is different from the first downlink data channel set, and the resource of the second uplink control channel does not overlap the resource of the first uplink control channel in time domain.

S650: The UE determines the resource of the second uplink control channel, where the second uplink control channel is used to carry the second HARQ-ACK information.

Specifically, for a method for determining, by the base station and the UE, the resource of the first uplink control channel and the resource of the second uplink control channel, refer to the related descriptions in the embodiment in FIG. 4.

S660: The base station sends second information to the UE, where the second information includes third information, the third information indicates a resource of a first uplink data channel, and the resource of the first uplink data channel overlaps the resource of the first uplink control channel and the resource of the second uplink control channel in time domain. Correspondingly, the UE receives the second information that is from the base station.

Codebooks of the first HARQ-ACK information and the second HARQ-ACK information may be determined by using one of the following two methods:

Method 1: The second information is DCI, and the second information further includes a first DAI. In a possible solution, the first DAI is used in determining codebooks of both the first HARQ-ACK information and the second HARQ-ACK information. For example, the base station indicates a larger value of a DAI. After receiving the DAI, the UE may add zeroes to the end of a codebook whose actual length is smaller, to keep consistency with the value of the DAI. In another possible solution, the first DAI is only used in determining a codebook of third HARQ-ACK information, and the third HARQ-ACK information is the first HARQ-ACK information or the second HARQ-ACK information. In other words, the first DAI is only used in determining the codebook of the first HARQ-ACK information or the second HARQ-ACK information.

Method 2: The second information is DCI, and the second information further includes a second DAI and a third DAI. The second DAI is used in determining a codebook of the first HARQ-ACK information, and the third DAI is used in determining a codebook of the second HARQ-ACK information.

Beta offsets of the first HARQ-ACK information and the second HARQ-ACK information may be obtained by using one of the following three methods:

Method 1: The second information further includes fourth information. The fourth information is used to indicate a first offset value and a second offset value. The first offset value is used to determine a resource for transmitting the first HARQ-ACK information, and the second offset value is used to determine a resource for transmitting the second HARQ-ACK information. The second information herein may be DCI. To reduce DCI overheads, a plurality of groups of offset values may be configured by using higher layer signaling, and then a specific group of offset values to be used is indicated by using the DCI. A specific implementation may be as follows: The base station sends fifth information to the UE, where the fifth information includes P groups of offset values, each group of offset values includes two offset values, and P is a positive integer. It may be understood that each group of offset values herein may further include a plurality of offset values. Specifically, a quantity of offset values that may be included in one group is related to a quantity of HARQ-ACK codebooks that can be used for multiplex transmission and that can be supported by one uplink data channel. Two offset values included in each group of offset values herein respectively correspond to the first offset value and the second offset value. The fourth information indicates an index of a group of offset values in the P groups of offset values. The second information herein may be DCI. The second information may alternatively be higher layer signaling, for example, a MAC CE or RRC signaling. The higher layer signaling directly includes configuration information, that is, the fourth information, of a first off-set value and a second off-set value.

Method 2: The second information further includes a third offset value, the third offset value is used to determine a resource for transmitting the third HARQ-ACK information, and the third HARQ-ACK information is the first HARQ-ACK information or the second HARQ-ACK information. In other words, the third offset value is only used in determining the transmission resource of the first HARQ-ACK information or the second HARQ-ACK information. Optionally, the second information is DCI, a third off-set value is dynamically indicated, and an off-set value of HARQ-ACK information that is not the third HARQ-ACK information and that is either the first HARQ-ACK information or the second HARQ-ACK information may be predefined or preconfigured, or dynamically indicated by using other DCI (for example, group common DCI).

Method 3: The second information further includes a first offset value and a second offset value. The first offset value is used to determine a resource for transmitting the first HARQ-ACK information, and the second offset value is used to determine a resource for transmitting the second HARQ-ACK information. Optionally, the second information herein may be DCI, or may be a parameter in higher layer signaling.

In the foregoing process of determining the DAIs and the beta offsets of the first HARQ-ACK information and the second HARQ-ACK information, the base station and the UE may determine whether the third HARQ-ACK information is the first HARQ-ACK information or the second HARQ-ACK information by using one of the following methods:

(1) The base station sends sixth information to the UE, where the sixth information indicates the third HARQ-ACK information, to be specific, indicates whether the third HARQ-ACK information is specifically the first HARQ-ACK information or the second HARQ-ACK information. Optionally, the sixth information may be carried in DCI or higher layer signaling.

(2) Whether the third HARQ-ACK information is specifically the first HARQ-ACK information or the second HARQ-ACK information is predefined.

(3) The third HARQ-ACK information is HARQ-ACK information that meets a fifth condition and that is either the first HARQ-ACK information or the second HARQ-ACK information, to be specific, the third HARQ-ACK information is HARQ-ACK information that is either the first HARQ-ACK information or the second HARQ-ACK information and to which a service type corresponds is the same as a service type corresponding to the resource of the first uplink data channel.

Optionally, the fifth condition is: the third HARQ-ACK information meets the second condition, and the first uplink data channel meets a sixth condition, or the third HARQ-ACK information does not meet the second condition, and the first uplink data channel does not meet a sixth condition.

Optionally, the sixth condition is: an MCS table associated with an uplink data channel is a first MCS table, where the first MCS table may be one of a plurality of MCS tables configured by using higher layer signaling for uplink data transmission, and spectral efficiency corresponding to a smallest MCS index in the first MCS table is the smallest in the plurality of MCS tables; or a value of a first field in DCI for scheduling an uplink data channel is a first preset value, where the first preset value may be configured by using higher layer signaling or predefined, and the first preset value may indicate that a downlink data channel scheduled by the second information carries low-latency and ultra-reliable data; or a format of DCI for scheduling an uplink data channel is a first DCI format, where the first DCI format may be configured by using higher layer signaling or predefined, and a payload (payload) size corresponding to the first DCI format may be a smallest payload size in all DCI formats; or a CORESET in which DCI for scheduling an uplink data channel is located belongs to a first CORESET set, where the first CORESET set may be configured by using higher layer signaling or predefined; or an SS in which DCI for scheduling an uplink data channel is located belongs to a first SS set, where the first SS set may be configured by using higher layer signaling or predefined. It may be understood that the conditions may be separately used as the sixth condition, or may be combined as the sixth condition. This is not limited herein.

For a method for determining, by the UE, the MCS table associated with the first uplink data channel, refer to the method for determining, by the UE, the MCS table used for the downlink data transmission. The only difference is that when the DCI for scheduling downlink data is not fallback DCI, the DCI may be in DCI format 1_1 in an NR protocol, and when the DCI for scheduling uplink data is not fallback DCI, the DCI may be in DCI format 0_1 in the NR protocol. Details are not described herein.

S670: The UE sends the first HARQ-ACK information and the second HARQ-ACK information to the base station on the resource of the first uplink data channel. Correspondingly, the base station receives the first HARQ-ACK information and the second HARQ-ACK information on the resource of the first uplink data channel.

Figure 7:
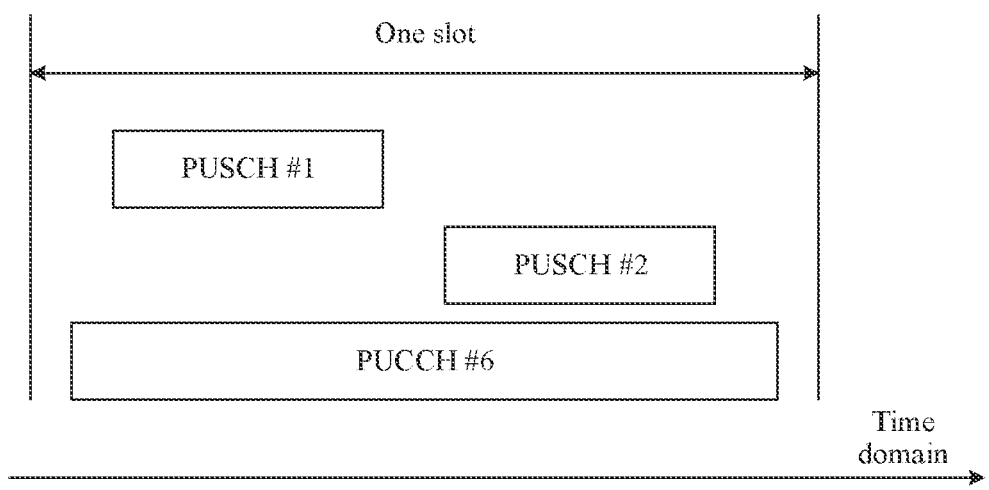
FIG. 7 shows yet another control information multiplex transmission scenario to which an embodiment of this application is applied.

FIG. 7 is still another uplink control information multiplex transmission application scenario according to an embodiment of this application. As shown in FIG. 7, a PUSCH #1 that carries first uplink data does not overlap a PUSCH #2 that carries second uplink data in time domain, a PUCCH #6 that carries second UCI overlap both the PUSCH #1 and the PUSCH #2 in time domain, and both the PUCCH and the two PUSCHs are located in a same time unit, for example, in one slot.

For the scenario shown in FIG. 7, UE may select a PUSCH resource to perform UCI multiplex transmission. A specific method is described in FIG. 8. The method may be performed by a base station, or may be performed by a function module in a base station, for example, a chip in the base station. The method may also be performed by UE, or may be performed by a function module in UE, for example, a chip in the UE. For ease of description, the following uses an example in which the method is performed by the UE and the base station for description.

S810: The base station determines a resource of a first uplink data channel, where the first uplink data channel is used to transmit first uplink data.

S820. The UE determines the resource of the first uplink data channel.

S830: The base station determines a resource of a second uplink data channel, where the second uplink data channel is used to transmit second uplink data, the second uplink data is different from the first uplink data, and the resource of the second uplink data channel does not overlap the resource of the first uplink data channel in time domain.

Optionally, both the first uplink data channel and the second uplink data channel are uplink data channels scheduled by DCI, or are uplink data channels based on configured grant.

Optionally, neither the first uplink data channel nor the second uplink data channel carries A-CSI, or both the first uplink data channel and the second uplink data channel carry A-CSI.

S840: The UE determines the resource of the second uplink data channel.

S850: The base station determines a resource of a sixth uplink control channel, where the sixth uplink control channel is used to carry second UCI, and the resource of the sixth uplink control channel overlaps both the resource of the first uplink data channel and the resource of the second uplink data channel.

S860: The UE determines the resource of the sixth uplink control channel.

The base station may determine the resource of the first uplink data channel, the resource of the second uplink data channel, and the resource of the sixth uplink control channel by using a resource allocation algorithm. A specific determining method is not limited in this embodiment of this application.

The UE may determine the resource of the first uplink data channel, the resource of the second uplink data channel, and the resource of the sixth uplink control channel by using signaling sent by the base station. A specific determining method is not limited in this embodiment of this application.

S870: The base station determines a resource of a third uplink data channel, where the third uplink data channel is used to carry the second UCI, and the resource of the third uplink data channel is the resource of the first uplink data channel or the resource of the second uplink data channel.

S880: The UE determines the resource of the third uplink data channel.

The base station and the UE may determine the resource of the third uplink data channel according to at least one of the following three methods: (1) A resource that is of an uplink data channel not meeting a sixth condition and that is either the resource of the first uplink data channel or the resource of the second uplink data channel is used as the resource of the third uplink data channel, to be specific, a resource of an uplink data channel whose service type of carried data is eMBB is used as the resource of the third uplink data channel. According to this method, impact of UCI on URLLC service data can be avoided, thereby better ensuring a transmission latency and transmission reliability of the URLLC service data. (2) A resource of an uplink data channel whose resource has an earlier start symbol is used as the resource of the third uplink data channel. According to this method, UCI can be sent to the base station earlier, so that a transmission latency of the UCI is shortened, and data transmission efficiency is improved. (3) A resource that is of an uplink data channel meeting a seventh condition and that is either the resource of the first uplink data channel or the resource of the second uplink data channel is used as the resource of the third uplink data channel, to be specific, a resource that is of an uplink data channel, that is either the resource of the first uplink data channel or the resource of the second uplink data channel, and to which a service type of transmitted data corresponds is the same as a service type corresponding to the second UCI is used as the resource of the third uplink data channel. For example, assuming that the first uplink data is URLLC service data, the second uplink data is eMBB service data, and the second UCI is UCI corresponding to the URLLC service data, the resource of the first uplink data channel is used as the resource of the third uplink data channel.

When the second UCI includes HARQ-ACK information, the seventh condition may be: the second UCI meets a second condition, and the third uplink data channel meets the sixth condition, or the second UCI does not meet a second condition, and the third uplink data channel does not meet the sixth condition.

When the second UCI includes CSI, the seventh condition may be: the second UCI meets a third condition, and the third uplink data channel meets the sixth condition, or the second UCI does not meet a third condition, and the third uplink data channel does not meet the sixth condition.

When the second UCI includes an SR, the seventh condition may be: the second UCI meets a fourth condition, and the third uplink data channel meets the sixth condition, or the second UCI does not meet a fourth condition, and the third uplink data channel does not meet the sixth condition.

S890: The UE sends the second UCI to the base station on the resource of the third uplink data channel. Correspondingly, the base station receives, on the resource of the third uplink data channel, the second UCI from the UE.

It may be understood that, to implement the functions in the foregoing embodiments, the UE and the base station include corresponding hardware structures and/or software modules for performing the functions. A person of ordinary skill in the art should easily be aware that, in combination with the units and the method steps in the examples described in the embodiments disclosed in this application, this application can be implemented by hardware or a combination of hardware and computer software. Whether a function is performed by hardware or hardware driven by computer software depends on particular application scenarios and design constraints of the technical solutions.

Figure 9:
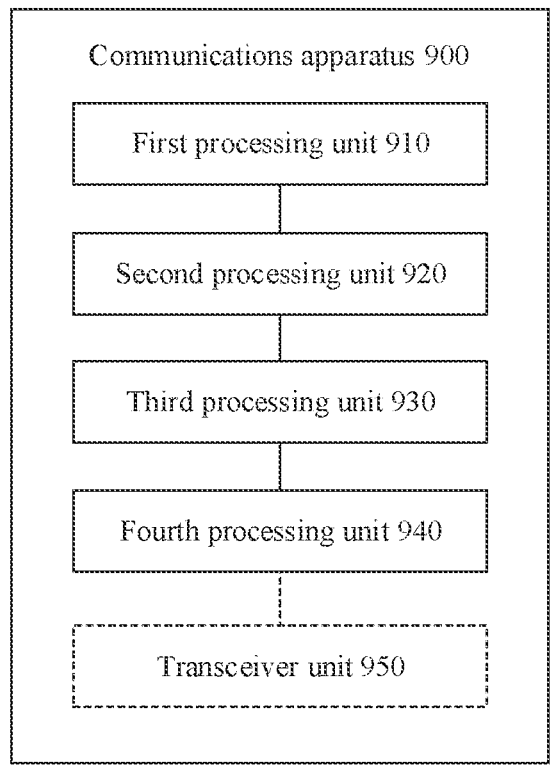
FIG. 9 is a schematic structural diagram of a communications apparatus according to an embodiment of this application.
Figure 10:
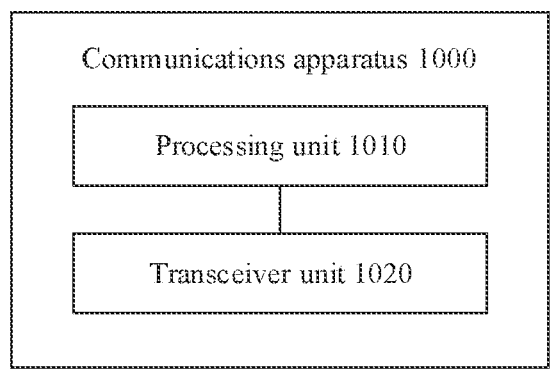
FIG. 10 is a schematic structural diagram of another communications apparatus according to an embodiment of this application.
Figure 11:
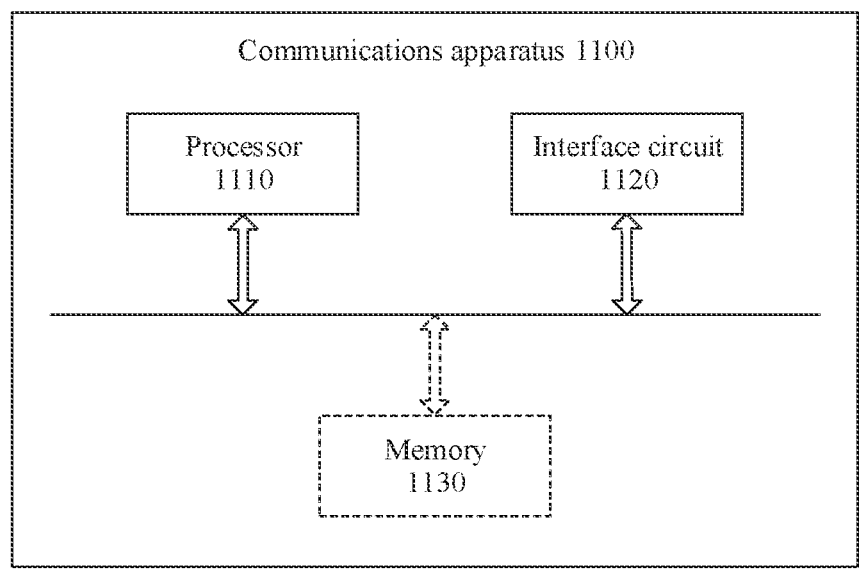
FIG. 11 is a schematic structural diagram of still another communications apparatus according to an embodiment of this application.

FIG. 9, FIG. 10, and FIG. 11 are possible schematic structural diagrams of communications apparatuses according to embodiments of this application. The communications apparatuses may be configured to implement the functions of the UE or the base station in the foregoing method embodiments. Therefore, beneficial effects of the foregoing method embodiments can also be achieved. In the embodiments of this application, the communications apparatus may be the terminal device 130 or the terminal device 140 shown in FIG. 1, or may be the radio access network device 120 shown in FIG. 1, or may be a component used in the terminal device or the network device, for example, may be a chip used in the terminal device or the network device.

As shown in FIG. 9, a communications apparatus 900 includes a first processing unit 910, a second processing unit 920, a third processing unit 930, and a fourth processing unit 940. Optionally, the communications apparatus may further include a transceiver unit 950. The communications apparatus 900 is configured to implement the function of the UE or the base station in the method embodiment shown in FIG. 4.

The first processing unit 910 is configured to determine a resource of a first uplink control channel, where the first uplink control channel is used to carry first HARQ-ACK information, the first HARQ-ACK information is used to indicate whether a first downlink data channel set is correctly decoded, and the first downlink data channel set includes at least one downlink data channel.

The second processing unit 920 is configured to determine a resource of a second uplink control channel, where the second uplink control channel is used to carry second HARQ-ACK information, the second HARQ-ACK information is used to indicate whether a second downlink data channel set is correctly decoded, the second downlink data channel set includes at least one downlink data channel, the second downlink data channel set is different from the first downlink data channel set, and the resource of the second uplink control channel does not overlap the resource of the first uplink control channel in time domain.

The third processing unit 930 is configured to determine a resource of a third uplink control channel, where the third uplink control channel is used to carry first uplink control information UCI, the first UCI includes channel state information CSI or a scheduling request SR, and the resource of the third uplink control channel overlaps the resource of the first uplink control channel and the resource of the second uplink control channel in time domain.

The fourth processing unit 940 is configured to determine a resource of a fourth uplink control channel, where the fourth uplink control channel is used to carry third HARQ-ACK information and the first UCI, the third HARQ-ACK information is the first HARQ-ACK information or the second HARQ-ACK information, and the third HARQ-ACK information is determined based on a format of the first uplink control channel, a format of the second uplink control channel, and a format of the third uplink control channel, or the third HARQ-ACK information is HARQ-ACK information that meets a first condition and that is either the first HARQ-ACK information or the second HARQ-ACK information.

Further, the fourth processing unit 940 is further configured to: when a format of the first uplink control channel is format 0, a format of the second uplink control channel is format 1, and a format of the third uplink control channel is format 0, determine the first HARQ-ACK information as the third HARQ-ACK information; and/or when a format of the first uplink control channel is format 2, format 3, or format 4, a format of the second uplink control channel is format 1, and a format of the third uplink control channel is format 0 or format 1, determine the first HARQ-ACK information as the third HARQ-ACK information.

Further, when the third HARQ-ACK information is the first HARQ-ACK information, the fourth processing unit 940 may be further configured to perform at least one of the following processing processes: (1) When the format of the first uplink control channel and the format of the third uplink control channel each are format 0, the resource of the first uplink control channel is determined as the resource of the fourth uplink control channel. (2) When the format of the first uplink control channel and the format of the third uplink control channel each are format 1, the resource of the first uplink control channel or the resource of the third uplink control channel is determined as the resource of the fourth uplink control channel. (3) When the format of the first uplink control channel is format 2, format 3, or format 4, the resource of the fourth uplink control channel is determined based on a total quantity of bits of the first HARQ-ACK information and the first UCI. (4) When the format of the third uplink control channel is format 2, format 3, or format 4, the resource of the fourth uplink control channel is determined based on a total quantity of bits of the first HARQ-ACK information and the first UCI.

Further, when the third HARQ-ACK information is the first HARQ-ACK information, the fourth processing unit 940 may be further configured to determine the resource of the fourth uplink control channel based on a total quantity of bits of the first HARQ-ACK information and the first UCI.

When the communications apparatus 900 is a terminal device or a component used in a terminal device, the transceiver unit 950 is configured to: send the first HARQ-ACK information and the first UCI on the resource of the fourth uplink control channel, and send the second HARQ-ACK information on the resource of the second uplink control channel.

When the communications apparatus 900 is a terminal device or a component used in a terminal device, and the third HARQ-ACK information is the first HARQ-ACK information, the transceiver unit 950 is configured to: when the resource of the fourth uplink control channel does not overlap the resource of the second uplink control channel, send the first HARQ-ACK information and the first UCI on the resource of the fourth uplink control channel, and send the second HARQ-ACK information on the resource of the second uplink control channel; and/or when the resource of the fourth uplink control channel overlaps the resource of the second uplink control channel, send the first HARQ-ACK information, the second HARQ-ACK information, and the first UCI on a resource of a fifth uplink control channel, where the resource of the fifth uplink control channel is determined based on a total quantity of bits of the first HARQ-ACK information, the second HARQ-ACK information, and the first UCI.

When the communications apparatus 900 is a network device or a component used in a network device, the transceiver unit 950 is configured to: receive the first HARQ-ACK information and the first UCI on the resource of the fourth uplink control channel, and receive the second HARQ-ACK information on the resource of the second uplink control channel. Alternatively, when the communications apparatus 900 is a network device or a component used in a network device, and the third HARQ-ACK information is the first HARQ-ACK information, the transceiver unit 950 is configured to: when the resource of the fourth uplink control channel does not overlap the resource of the second uplink control channel, receive the first HARQ-ACK information and the first UCI on the resource of the fourth uplink control channel, and receive the second HARQ-ACK information on the resource of the second uplink control channel; and/or when the resource of the fourth uplink control channel overlaps the resource of the second uplink control channel, receive the first HARQ-ACK information, the second HARQ-ACK information, and the first UCI on a resource of a fifth uplink control channel, where the resource of the fifth uplink control channel is determined based on a total quantity of bits of the first HARQ-ACK information, the second HARQ-ACK information, and the first UCI.

For more detailed descriptions of the first processing unit 910, the second processing unit 920, the third processing unit 930, and the fourth processing unit 940, directly refer to related descriptions in the method embodiment shown in FIG. 4. Details are not described herein again.

As shown in FIG. 10, a communications apparatus 1000 includes a processing unit 1010 and a transceiver unit 1020. The communications apparatus 1000 is configured to implement the function of the UE or the base station in the method embodiment shown in FIG. 6 or FIG. 8.

When the communications apparatus 1000 is configured to implement the function of the UE in the method embodiment shown in FIG. 6, the transceiver unit 1020 is configured to receive first information, where the first information indicates that a HARQ-ACK codebook is a dynamic codebook. The processing unit 1010 is configured to determine a resource of a first uplink control channel, where the first uplink control channel is used to carry first HARQ-ACK information, the first HARQ-ACK information is used to indicate whether a first downlink data channel set is correctly decoded, and the first downlink data channel set includes at least one downlink data channel. The processing unit 1010 is further configured to determine a resource of a second uplink control channel, where the second uplink control channel is used to carry second HARQ-ACK information, the second HARQ-ACK information is used to indicate whether a second downlink data channel set is correctly decoded, the second downlink data channel set includes at least one downlink data channel, the second downlink data channel set is different from the first downlink data channel set, and the resource of the second uplink control channel does not overlap the resource of the first uplink control channel in time domain. The transceiver unit 1020 is further configured to receive second information, where the second information includes third information, the third information is used to indicate a resource of a first uplink data channel, and the resource of the first uplink data channel overlaps the resource of the first uplink control channel and the resource of the second uplink control channel in time domain. The transceiver unit 1020 is further configured to send the first HARQ-ACK information and the second HARQ-ACK information on the resource of the first uplink data channel.

The transceiver unit 1020 may be further configured to receive sixth information, where the sixth information indicates third HARQ-ACK information.

The transceiver unit 1020 may be further configured to receive fifth information, where the fifth information includes P groups of offset values, each group of offset values includes two offset values, and P is a positive integer.

When the communications apparatus 1000 is configured to implement the function of the base station in the method embodiment shown in FIG. 6, the transceiver unit 1020 is configured to send first information. The processing unit 1010 is configured to determine a resource of a first uplink control channel, where the first uplink control channel is used to carry first HARQ-ACK information. The processing unit 1010 is further configured to determine a resource of a second uplink control channel, where the second uplink control channel is used to carry second HARQ-ACK information. The transceiver unit 1020 is further configured to send second information. The transceiver unit 1020 is further configured to receive the first HARQ-ACK information and the second HARQ-ACK information on a resource of a first uplink data channel.

The transceiver unit 1020 may be further configured to send sixth information, where the sixth information indicates third HARQ-ACK information.

The transceiver unit 1020 may be further configured to send fifth information, where the fifth information includes P groups of offset values, each group of offset values includes two offset values, and P is a positive integer.

For more detailed descriptions of the processing unit 1010 and the transceiver unit 1020, directly refer to related descriptions in the method embodiment shown in FIG. 6. Details are not described herein again.

Figure 8:
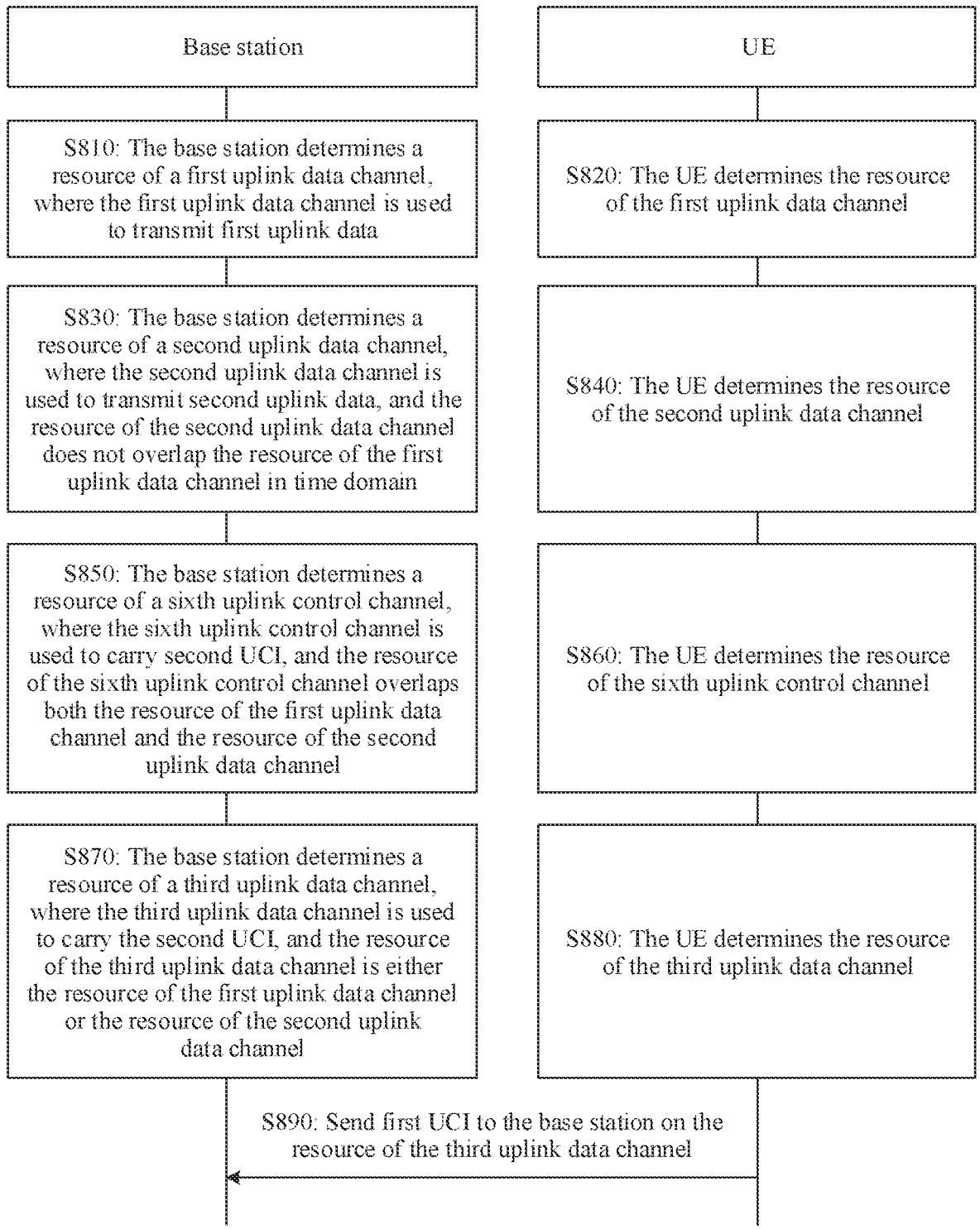
FIG. 8 is a schematic diagram of still another processing process of uplink control information multiplex transmission according to an embodiment of this application.

When the communications apparatus 1000 is configured to implement the function of the UE in the method embodiment shown in FIG. 8, the processing unit 1010 is configured to determine a resource of a first uplink data channel, where the first uplink data channel is used to transmit first uplink data. The processing unit 1010 is further configured to determine a resource of a second uplink data channel, where the second uplink data channel is used to transmit second uplink data, the second uplink data is different from the first uplink data, and the resource of the second uplink data channel does not overlap the resource of the first uplink data channel in time domain. The processing unit 1010 is further configured to determine a resource of a sixth uplink control channel, where the sixth uplink control channel is used to carry second UCI, and the resource of the sixth uplink control channel overlaps both the resource of the first uplink data channel and the resource of the second uplink data channel. The processing unit 1010 is further configured to determine a resource of a third uplink data channel, where the third uplink data channel is used to carry the second UCI, and the resource of the third uplink data channel is the resource of the first uplink data channel or the resource of the second uplink data channel. The transceiver unit 1020 is configured to send the second UCI on the resource of the third uplink data channel.

When the communications apparatus 1000 is configured to implement the function of the base station in the method embodiment shown in FIG. 8, the processing unit 1010 is configured to determine a resource of a first uplink data channel. The processing unit 1010 is further configured to determine a resource of a second uplink data channel. The processing unit 1010 is further configured to determine a resource of a sixth uplink control channel. The processing unit 1010 is further configured to determine a resource of a third uplink data channel. The transceiver unit 1020 is configured to receive second UCI on the resource of the third uplink data channel.

For more detailed descriptions of the processing unit 1010 and the transceiver unit 1020, directly refer to related descriptions in the method embodiment shown in FIG. 8. Details are not described herein again.

As shown in FIG. 11, a communications apparatus 1100 includes a processor 1110 and an interface circuit 1120. The processor 1110 and the interface circuit 1120 are coupled to each other. It may be understood that the interface circuit 1120 may be a transceiver or an input/output interface. Optionally, the communications apparatus 1100 may further include a memory 1130, configured to store an instruction or data to be executed by the processor 1110.

When the communications apparatus 1100 is configured to implement the method shown in FIG. 4, the processor 1110 is configured to execute functions of the first processing unit 910, the second processing unit 920, the third processing unit 930, and the fourth processing unit 940, and the interface circuit 1120 is configured to execute the function of the transceiver unit 950.

When the communications apparatus 1100 is configured to implement the method shown in FIG. 6 or FIG. 8, the processor 1110 is configured to execute the function of the processing unit 1010, and the interface circuit 1120 is configured to execute the function of the transceiver unit 1020.

When the communications apparatus is a chip used in a terminal device, the chip used in the terminal device implements the functions of the terminal device in the foregoing method embodiments. The chip used in the terminal device receives information from another module (for example, a radio frequency module or an antenna) in the terminal device, where the information is sent by a network device to the terminal device. Alternatively, the chip used in the terminal device sends information to another module (for example, a radio frequency module or an antenna) in the terminal device, where the information is sent by the terminal device to a network device.

When the communications apparatus is a chip used in a network device, the chip used in the network device implements the functions of the network device in the foregoing method embodiments. The chip used in the network device receives information from another module (for example, a radio frequency module or an antenna) in the network device, where the information is sent by a terminal device to the network device. Alternatively, the chip used in the network device sends information to another module (for example, a radio frequency module or an antenna) in the network device, where the information is sent by the network device to a terminal device.

It should be noted that the processor in the embodiments of this application may be a central processing unit (CPU), may be another general purpose processor, a digital signal processor (DSP), an application-specific integrated circuit (ASIC), a field programmable gate array (FPGA), or another programmable logical device, a transistor logical device, a hardware component, or any combination thereof. The general purpose processor may be a microprocessor or any conventional processor.

The method steps in the embodiments of this application may be implemented in a hardware manner or may be implemented in a manner of executing a software instruction by a processor. The software instruction may include a corresponding software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a mobile hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network device or a terminal device. Certainly, the processor and the storage medium may exist in a sending device or a receiving device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or the instructions are loaded and executed on a computer, the procedures or the functions according to the embodiments of this application are all or partially generated. The computer may be a general purpose computer, a dedicated computer, a computer network, or other programmable apparatuses. The computer programs or the instructions may be stored in a computer-readable storage medium, or may be transmitted by using the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid-state disk, SSD).

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, the term "at least one" means one or more, and the term "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

It may be understood that numerical symbols in the embodiments of this application are differentiated merely for ease of description, but are not used to limit the scope of the embodiments of this application. Sequence numbers of the foregoing processes do not mean execution sequences. The execution sequences of the processes should be determined according to functions and internal logic of the processes.

What is claimed is:

1. A method performed by an apparatus, comprising:
   determining a resource of a first uplink data channel, wherein the first uplink data channel is used to transmit first uplink data;
   determining a resource of a second uplink data channel, wherein the second uplink data channel is used to transmit second uplink data, the second uplink data is different from the first uplink data, and the resource of the second uplink data channel does not overlap the resource of the first uplink data channel in time domain;
   determining a resource of an uplink control channel, wherein the uplink control channel is used to carry uplink control information (UCI), the UCI comprises hybrid automatic repeat request-acknowledgement (HARQ-ACK) information, the resource of the uplink control channel overlaps the resource of the first uplink data channel in the time domain, and the resource of the uplink control channel overlaps the resource of the second uplink data channel in the time domain;
   determining, based on the uplink control channel overlapping the resource of the first uplink data channel and the resource of the second uplink data channel in the time domain, a resource of a third uplink data channel for multiplexing the UCI in the third uplink data channel, wherein the resource of the third uplink data channel is the resource of the first uplink data channel or the resource of the second uplink data channel; and
   sending the UCI on the resource of the third uplink data channel.

2. The method according to claim 1, wherein
the resource of the third uplink data channel meets a seventh condition, and the seventh condition is:
the UCI meets a second condition, and the third uplink data channel meets a sixth condition; or
the UCI does not meet the second condition, and the third uplink data channel does not meet the sixth condition;
the second condition is: a value of a field in downlink control information (DCI) for scheduling a downlink data channel corresponding to the HARQ-ACK information is equal to a first preset value, wherein the first preset value is predefined; and
the sixth condition is: a value of a field in DCI for indicating the resource of the third uplink data channel is equal to the first preset value.

3. The method according to claim 2, wherein the seventh condition indicates that the third uplink data channel and the UCI correspond to a same service type.

4. The method according to claim 2, wherein
a service type corresponding to the UCI is determined by the field in the DCI for scheduling the downlink data channel corresponding to the HARQ-ACK information; and/or
a service type of the third uplink data channel is determined by a field in DCI for scheduling the third uplink data channel.

5. The method according to claim 1, wherein the first uplink data channel and the second uplink data channel correspond to different service types.

6. An apparatus comprising:
a processor; and
a non-transitory computer readable medium storing a program to be executed by the processor, the program including instructions for:
determining a resource of a first uplink data channel, wherein the first uplink data channel is used to transmit first uplink data;
determining a resource of a second uplink data channel, wherein the second uplink data channel is used to transmit second uplink data, the second uplink data is different from the first uplink data, and the resource of the second uplink data channel does not overlap the resource of the first uplink data channel in time domain;
determining a resource of an uplink control channel, wherein the uplink control channel is used to carry uplink control information (UCI), the UCI comprises hybrid automatic repeat request-acknowledgement (HARQ-ACK) information, the resource of the uplink control channel overlaps the resource of the first uplink data channel in the time domain, and the resource of the uplink control channel overlaps the resource of the second uplink data channel in the time domain;
determining, based on the uplink control channel overlapping the resource of the first uplink data channel and the resource of the second uplink data channel in the time domain, a resource of a third uplink data channel for multiplexing the UCI in the third uplink data channel, wherein the resource of the third uplink data channel is the resource of the first uplink data channel or the resource of the second uplink data channel; and
sending the UCI on the resource of the third uplink data channel.

7. The apparatus according to claim 6, wherein
the resource of the third uplink data channel meets a seventh condition, and the seventh condition is:
the UCI meets a second condition, and the third uplink data channel meets a sixth condition; or
the UCI does not meet the second condition, and the third uplink data channel does not meet the sixth condition;
the second condition is: a value of a field in downlink control information (DCI) for scheduling a downlink data channel corresponding to the HARQ-ACK information is equal to a first preset value, wherein the first preset value is predefined; and
the sixth condition is: a value of a field in DCI for indicating the resource of the third uplink data channel is equal to the first preset value.

8. The apparatus according to claim 7, wherein the seventh condition indicates that the third uplink data channel and the UCI correspond to a same service type.

9. The apparatus according to claim 7, wherein
a service type corresponding to the UCI is determined by the field in the DCI for scheduling the downlink data channel corresponding to the HARQ-ACK information; and/or
a service type of the third uplink data channel is determined by a field in DCI for scheduling the third uplink data channel.

10. The apparatus according to claim 6, wherein the first uplink data channel and the second uplink data channel correspond to different service types.

11. An apparatus comprising:
a processor; and
a non-transitory computer readable medium storing a program to be executed by the processor, the program including instructions for:
determining a resource of a first uplink data channel, wherein the first uplink data channel is used to transmit first uplink data;
determining a resource of a second uplink data channel, wherein the second uplink data channel is used to transmit second uplink data, the second uplink data is different from the first uplink data, and the resource of the second uplink data channel does not overlap the resource of the first uplink data channel in time domain;
determining a resource of an uplink control channel, wherein the uplink control channel is used to carry uplink control information (UCI), the UCI comprises hybrid automatic repeat request-acknowledgement (HARQ-ACK) information, the resource of the uplink control channel overlaps the resource of the first uplink data channel in the time domain, and the resource of the uplink control channel overlaps the resource of the second uplink data channel in the time domain;
determining, based on the uplink control channel overlapping the resource of the first uplink data channel and the resource of the second uplink data channel in the time domain, a resource of a third uplink data channel, wherein the third uplink data channel is used to multiplex the UCI in the third uplink data channel, and the resource of the third uplink data channel is the resource of the first uplink data channel or the resource of the second uplink data channel; and
receiving the UCI on the resource of the third uplink data channel.

12. The apparatus according to claim 11, wherein
the resource of the third uplink data channel meets a seventh condition, and the seventh condition is:
the UCI meets a second condition, and the third uplink data channel meets a sixth condition; or
the UCI does not meet the second condition, and the third uplink data channel does not meet the sixth condition;
the second condition is: a value of a field in downlink control information (DCI) for scheduling a downlink data channel corresponding to the HARQ-ACK information is equal to a first preset value, wherein the first preset value is predefined; and the sixth condition is: a value of a field in DCI for indicating the resource of the third uplink data channel is equal to the first preset value.

13. The apparatus according to claim 12, wherein the seventh condition indicates that the third uplink data channel and the UCI correspond to a same service type.

14. The apparatus according to claim 12, wherein a service type corresponding to the UCI is determined by the field in the DCI for scheduling the downlink data channel corresponding to the HARQ-ACK information; and/or a service type of the third uplink data channel is determined by a field in DCI for scheduling the third uplink data channel.

15. The apparatus according to claim 11, wherein the first uplink data channel and the second uplink data channel correspond to different service types.

* * * * *